(12) United States Patent
Choi et al.

(10) Patent No.: US 11,805,552 B2
(45) Date of Patent: Oct. 31, 2023

(54) USER EQUIPMENT ENABLED SIDELINK RANGING WITH ADJUSTABLE BANDWIDTH

(71) Applicant: QUALCOMM Incorporated, San Diego, CA (US)

(72) Inventors: Chang-Sik Choi, Seoul (KR); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 17/670,159

(22) Filed: Feb. 11, 2022

(65) Prior Publication Data

US 2022/0279582 A1 Sep. 1, 2022

Related U.S. Application Data

(60) Provisional application No. 63/154,607, filed on Feb. 26, 2021.

(51) Int. Cl.
*H04W 74/08* (2009.01)
*H04L 5/00* (2006.01)

(52) U.S. Cl.
CPC ....... *H04W 74/0816* (2013.01); *H04L 5/0051* (2013.01); *H04W 74/0866* (2013.01)

(58) Field of Classification Search
CPC .......... H04W 74/0816; H04W 74/0866; H04L 5/0051
See application file for complete search history.

(56) References Cited

U.S. PATENT DOCUMENTS

| 2019/0124690 | A1 | 4/2019 | Siomina et al. |
| 2020/0068520 | A1 | 2/2020 | Marri Sridhar et al. |
| 2020/0382978 | A1 | 12/2020 | Manolakos et al. |
| 2021/0041522 | A1 | 2/2021 | Manolakos et al. |
| 2022/0069962 | A1* | 3/2022 | Bao ........................ H04L 5/0051 |
| 2022/0272484 | A1* | 8/2022 | Choi ...................... G01S 13/765 |

OTHER PUBLICATIONS

International Search Report and Written Opinion—PCT/US2022/016330—ISA/EPO—Aug. 2, 2022.
Partial International Search Report—PCT/US2022/016330—ISA/EPO—Jun. 2, 2022.

* cited by examiner

*Primary Examiner* — Derrick V Rose
(74) *Attorney, Agent, or Firm* — Thien T. Nguyen

(57) ABSTRACT

The bandwidth of ranging signals used in ranging session in a distributed system are dynamically adjusted based on the accuracy of the ranging over multiple ranging sessions and optionally based on the probability of successful Listen Before Transmit (LBT) procedure over the multiple ranging sessions. The accuracy of the ranging may be determined, e.g., based on the variance of determined ranges over a number of ranging sessions, which may be compared to a threshold to indicate low accuracy ranging. The bandwidth of the ranging signals may be increased based on an indication of low accuracy ranging. If the ranging signals are broadcast on unlicensed spectrum using LBT procedures, the probability of successful LBT procedures by the initiator UE, the responder UEs, or all participating UEs may be used to determine whether bandwidth of the ranging signals should be decreased.

50 Claims, 8 Drawing Sheets

USER EQUIPMENT ENABLED SIDELINK RANGING WITH ADJUSTABLE BANDWIDTH

CLAIM OF PRIORITY UNDER 35 U.S.C. § 119

This application claims under 35 USC § 119 the benefit of and priority to U.S. Provisional Application No. 63/154,607, filed Feb. 26, 2021, and entitled "USER EQUIPMENT ENABLED SIDELINK RANGING WITH ADJUSTABLE BANDWIDTH," which is assigned to the assignee hereof and is incorporated herein by reference in its entirety.

BACKGROUND

Background Field

The subject matter disclosed herein relates to wireless communications systems, and more particularly to methods and apparatuses for ranging or positioning of user equipment in a distributed wireless communications system.

Relevant Background

Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

A common means to determine the location of a device is to use a satellite positioning system (SPS), such as the well-known Global Positioning Satellite (GPS) system or Global Navigation Satellite System (GNSS), which employ a number of satellites that are in orbit around the Earth. In certain scenarios, however, location determination signals from an SPS may be unreliable or unavailable, e.g., during adverse weather conditions or in areas with poor satellite signal reception such as tunnels or parking complexes. Moreover, position information generated using SPS is prone to imprecision. For example, off-the-shelf GPS positioning devices have an accuracy of a few meters, which is not optimal to ensure safe autonomous driving and navigation.

Coordinated or automated driving requires communications between vehicles, which may be direct or indirect, e.g., via an infrastructure component such as a roadside unit (RSU). For vehicle safety applications, both positioning and ranging are important. For example, vehicle user equipments (UEs) may perform positioning and ranging using sidelink signaling, e.g., broadcasting ranging signals for other vehicle UEs or pedestrian UEs to determine the relative location of the transmitter. An accurate and timely knowledge of the relative locations or ranges to nearby vehicles, enables automated vehicles to safely maneuver and negotiate traffic conditions. Round trip time (RTT), for example, is a technique commonly used for determining a range between transmitters. RTT is a two-way messaging technique in which the time between sending a ranging signal from a first device to receiving an acknowledgement (e.g., in the form of return ranging signal) from a second device (minus processing delays) corresponds to the distance (range) between the two devices.

The accuracy of determined ranges between transmitters, and thus, the accuracy of positioning as well, is related to the bandwidths used during transmission of the ranging signals. For example, increasing the bandwidths of the ranging signals will improve the accuracy of the determined ranges. Ranging sessions in a distributed system, i.e., without infrastructure support to coordinate messaging, has no centralized control of the bandwidths used during transmission of the ranging signals.

SUMMARY

The bandwidth of ranging signals used in ranging session in a distributed system are dynamically adjusted based on the accuracy of the ranging over multiple ranging sessions and optionally based on the probability of successful Listen Before Transmit (LBT) procedure over the multiple ranging sessions. The accuracy of the ranging may be determined, e.g., based on the variance of determined ranges over a number of ranging sessions, which may be compared to a threshold to indicate low accuracy ranging. The bandwidth of the ranging signals may be increased based on an indication of low accuracy ranging. If the ranging signals are broadcast on unlicensed spectrum using LBT procedures, the probability of successful LBT procedures by the initiator UE, the responder UEs, or all participating UEs may be used to determine whether bandwidth of the ranging signals should be decreased.

In one implementation, a method of ranging performed by an initiator user equipment (UE) in a distributed system of UEs, includes initiating with a plurality of responder UEs a plurality of ranging sessions that use a first ranging signal bandwidth; determining a range to each responder UE in each ranging session; determining an indication of accuracy of ranging to each responder UE in the plurality of ranging sessions; receiving from one or more responder UEs an indication of accuracy of ranging determined by each respective responder UE in the plurality of ranging sessions; determining to adjust the first ranging signal bandwidth to a second ranging signal bandwidth that is different than the first ranging signal bandwidth in a new ranging session based on the indication of accuracy of the ranging to each responder UE and the indication of accuracy of the ranging received from the one or more responder UEs.

In one implementation, an initiator user equipment (UE) configured for ranging between UEs in a distributed system of UEs, includes a wireless transceiver configured to wirelessly communicate with entities in a wireless network; at least one memory; and at least one processor coupled to the wireless transceiver and the at least one memory, wherein the at least one processor is configured to: initiate with a plurality of responder UEs a plurality of ranging sessions that use a first ranging signal bandwidth; determine a range to each responder UE in each ranging session; determine an indication of accuracy of ranging to each responder UE in the plurality of ranging sessions; receive from one or more responder UEs an indication of accuracy of ranging determined by each respective responder UE in the plurality of ranging sessions; determine to adjust the first ranging signal bandwidth to a second ranging signal bandwidth that is different than the first ranging signal bandwidth in a new ranging session based on the indication of accuracy of the ranging to each responder UE and the indication of accuracy of the ranging received from the one or more responder UEs.

In one implementation, an initiator user equipment (UE) configured for ranging between UEs in a distributed system of UEs, the initiator UE includes means for initiating with a plurality of responder UEs a plurality of ranging sessions that use a first ranging signal bandwidth; means for determining a range to each responder UE in each ranging session; means for determining an indication of accuracy of ranging to each responder UE in the plurality of ranging sessions; means for receiving from one or more responder UEs an indication of accuracy of ranging determined by each respective responder UE in the plurality of ranging sessions; means for determining to adjust the first ranging signal bandwidth to a second ranging signal bandwidth that is different than the first ranging signal bandwidth in a new ranging session based on the indication of accuracy of the ranging to each responder UE and the indication of accuracy of the ranging received from the one or more responder UEs.

In one implementation, a non-transitory storage medium including program code stored thereon, the program code is operable to configure at least one processor in an initiator user equipment (UE) for ranging between UEs in a distributed system of UEs, the program code comprising instructions to: initiate with a plurality of responder UEs a plurality of ranging sessions that use a first ranging signal bandwidth; determine a range to each responder UE in each ranging session; determine an indication of accuracy of ranging to each responder UE in the plurality of ranging sessions; receive from one or more responder UEs an indication of accuracy of ranging determined by each respective responder UE in the plurality of ranging sessions; determine to adjust the first ranging signal bandwidth to a second ranging signal bandwidth that is different than the first ranging signal bandwidth in a new ranging session based on the indication of accuracy of the ranging to each responder UE and the indication of accuracy of the ranging received from the one or more responder UEs.

In one implementation, a method of ranging performed by a responder user equipment (UE) in a distributed system of UEs, includes receiving from an initiator UE initiation of a plurality of ranging sessions that use a first ranging signal bandwidth; determining a range to the initiator UE in each ranging session; determining an indication of accuracy of ranging to the initiator UE in the plurality of ranging sessions; sending to the initiator UE the indication of accuracy of the ranging; and receiving from the initiator UE an initiation of a new ranging session that uses a second ranging signal bandwidth that is different than the first ranging signal bandwidth and that is at least partly in response to the indication of accuracy of the ranging sent to the initiator UE.

In one implementation, a responder user equipment (UE) configured for ranging between UEs in a distributed system of UEs, includes a wireless transceiver configured to wirelessly communicate with entities in a wireless network; at least one memory; and at least one processor coupled to the wireless transceiver and the at least one memory, wherein the at least one processor is configured to: receive from an initiator UE initiation of a plurality of ranging sessions that use a first ranging signal bandwidth; determine a range to the initiator UE in each ranging session; determine an indication of accuracy of ranging to the initiator UE in the plurality of ranging sessions; send to the initiator UE the indication of accuracy of the ranging; and receive from the initiator UE an initiation of a new ranging session that uses a second ranging signal bandwidth that is different than the first ranging signal bandwidth and that is at least partly in response to the indication of accuracy of the ranging sent to the initiator UE.

In one implementation, a responder user equipment (UE) configured for ranging between UEs in a distributed system of UEs, the responder UE includes means for receiving from an initiator UE initiation of a plurality of ranging sessions that use a first ranging signal bandwidth; means for determining a range to the initiator UE in each ranging session; means for determining an indication of accuracy of ranging to the initiator UE in the plurality of ranging sessions; means for sending to the initiator UE the indication of accuracy of the ranging; and means for receiving from the initiator UE an initiation of a new ranging session that uses a second ranging signal bandwidth that is different than the first ranging signal bandwidth and that is at least partly in response to the indication of accuracy of the ranging sent to the initiator UE.

In one implementation, a non-transitory storage medium including program code stored thereon, the program code is operable to configure at least one processor in a responder user equipment (UE) for ranging between UEs in a distributed system of UEs, the program code comprising instructions to: receive from an initiator UE initiation of a plurality of ranging sessions that use a first ranging signal bandwidth; determine a range to the initiator UE in each ranging session; determine an indication of accuracy of ranging to the initiator UE in the plurality of ranging sessions; send to the initiator UE the indication of accuracy of the ranging; and receive from the initiator UE an initiation of a new ranging session that uses a second ranging signal bandwidth that is different than the first ranging signal bandwidth and that is at least partly in response to the indication of accuracy of the ranging sent to the initiator UE.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
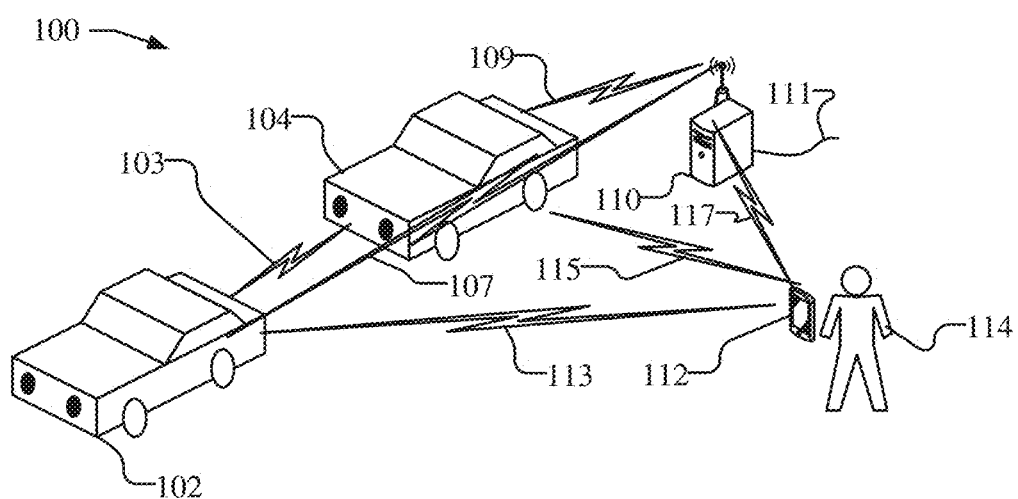
FIG. 1 illustrates a wireless communication system illustrating distributed communications, including ranging signaling to support dynamically variable ranging signal bandwidths.

A distributed approach may be used for ranging and positioning of vehicles, roadside units (RSU), and pedestrian and may avoid the need for a centralized base station to coordinate and relay communications. Such communications may be used, for example, for automated driving and vehicle safety applications. Communications used in a distributed approach may be made directly, e.g., between vehicles, or between vehicles and a RSU or pedestrian. These communications may include messages and information elements (IEs) with which a vehicle may provide information necessary for automated driving.

For example, for safe operation of autonomous vehicles, the relative locations or ranges to other vehicles needs to be determined. Various approaches may be used to derive the relative positions between vehicles. For example, relative positions of vehicles may be derived using ranging signaling. Ranging signals are sometimes referred to as physical ranging signals, positioning ranging signals, positioning reference signals, or physical referencing signals, and may be collectively referred to herein as PRS signals. PRS signals, for example, may be broadcast by a user equipment (UE) in a vehicle, sometimes referred to as V-UE, and received by other V-UEs and/or infrastructure, e.g., RSU, or UEs held by a pedestrian, using direct communication systems, such as dedicated short-range communication (DSRC), cellular Vehicle-to-Everything (C-V2X) communication, and even 5G New Radio (NR) communications. PRS signals are used to determine a range to the broadcasting vehicle, e.g., using one way ranging, round-trip-time (RTT) positioning operations, or other standard positioning operations such as time of arrival (TOA), time difference of arrival (TDOA) or observed time difference of arrival (OT-DOA).

In a distributed system, an individual UE is able to range with respect to other UEs that are nearby using messages and positioning signals that are transmitted directly to the other UEs. In an RTT-based ranging session, for example, multiple messages and signals are transmitted and received by each UE. For example, an initial set of pre-ranging signal messages (pre-PRS messages) are transmitted and received to request and accept a ranging session, followed by broadcasting the ranging signals (PRS signals) for measurement, which is followed by a set of post-ranging signal messages (post-PRS messages) that exchange measurement payloads. For RTT-based ranging and positioning, for example, the time of arrival (TOA) and time of departure (TOD) measurements of transmitted and received PRS signals may be provided in the post-PRS messages and used by each UE pair to determine the range between the UEs. The pre-PRS and post-PRS messages may be sent over a licensed spectrum to guarantee reliability, while the PRS signals may be broadcast over a licensed spectrum or an unlicensed spectrum (e.g., to enjoy a larger available bandwidth in e.g., UNI-III spectrum).

The accuracy of the determined ranges between transmitting UEs is related to the size of the frequency bands used to transmit the PRS signals. For example, by increasing the PRS bandwidth, the accuracy of the determine range may be increased. Unfortunately, in a distributed ranging system, centralized control of the PRS bandwidths is infeasible. For example, in a distributed ranging system in which PRS signals are transmitted over a licensed spectrum, there may be limitations to the frequency bands used, e.g., based on demand. In a distributed ranging system in which PRS signals are transmitted over an unlicensed spectrum, listen-before-transmit (LBT) protocols may be employed, and potential accuracy improvements achieved by PRS transmissions over large frequency bands may be offset by an increase in LBT failure rates. Thus, it may be desirable to dynamically enable UEs to adjust the PRS bandwidth used during ranging sessions, e.g., based on an indication of a demand or need to increase PRS bandwidth. Moreover, a balancing approach may be used to minimize the increase in LBT failure rates for PRS transmissions in an unlicensed spectrum.

Accordingly, in an implementation, as discussed herein, UEs may participate in a plurality of ranging sessions using a ranging signal bandwidth as initiated by the initiator UE. The initiator UE may determine an indication of the accuracy of the determined ranges to each responder UE over the plurality of ranging sessions. The indication of accuracy, for example, may be based on the variance in the determined ranges to each responder UE over a number of ranging sessions, which may be compared to a first threshold to identify low accuracy ranges. Responder UEs may likewise determine an indication of the accuracy of the determined range to the initiator UE over the plurality of ranging sessions and may send the indication of accuracy to the initiator UE, e.g., in a message that is separate to the ranging session or in a post-ranging message. The initiator UE may determine whether to increase the bandwidth of the ranging signals in subsequent ranging sessions based on the indications of accuracy, e.g., if the number of low accuracy ranges for all participating UEs is greater than a second threshold. The number of ranging sessions and the first threshold used to determine low accuracy ranges, may be based on the speed of the initiator UE, while the second threshold may be based on the accuracy requirement for the ranging session.

Additionally, where the ranging signals are broadcast over an unlicensed spectrum and LBT procedures are used, the initiator UE and/or the responder UEs may monitor the LBT success rate over a number of ranging sessions, which may be compared to a third threshold to identify low LBT success rates. The responder UEs may send an indication of the LBT success rate to the initiator UE, e.g., along with the indications of accuracy. The initiator UE may determine whether to decrease the bandwidth of the ranging signals in subsequent ranging sessions further based on the indications of LBT success rate determined by itself, received from the responder UEs, or a combination thereof. For example, if the ranging signals for the initiator UE have a low LBT success rate, the initiator UE may decrease the bandwidth of the ranging signals in subsequent ranging sessions. Similarly, if a large number of responder UEs (or all participating UEs) indicate a low LBT success rate, e.g., a number greater than a fourth threshold, the initiator UE may decrease the bandwidth of the ranging signals in subsequent ranging sessions. The number of ranging sessions used to determine low LBT success rates may be based on the speed of the initiator UE, while the third threshold and the fourth threshold may be based on the number of responder UEs.

Accordingly, dynamically variable ranging signal bandwidths may be enabled in a distributed ranging system, e.g., a system without centralized control. Moreover, if LBT procedures are used, the adjustment in ranging signal bandwidths is balanced with respect to the LBT failure rate.

FIG. 1 illustrates a wireless communication system 100 illustrating distributed communications, including ranging signaling to support dynamically variable ranging signal bandwidths, as described herein. Wireless communication system 100 illustrates a first vehicle 102 with a first wireless device, e.g., V-UE 102, in wireless communications with another V-UE 104, illustrated as a second vehicle. The V-UE 102 and V-UE 104 may comprise, but are not limited to, an on-board unit (OBU), a vehicle or subsystem thereof, or various other communication devices. The V-UEs 102 and 104 function and provide communications on behalf of their associated vehicles and, accordingly, may be sometimes referred to herein simply as vehicles 102 and 104 or UEs 102 and 104. The first UE 102 and second UE 104, for example, may be two vehicles traveling on a road along with other vehicles, not illustrated.

The wireless communication system 100 may use, e.g., Vehicle-to-Everything (V2X) communication standard, in which information is passed between a vehicle and other entities within the wireless communication network. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop autonomous or semi-autonomous driving systems, such as Advanced Driver Assistance System (ADAS), which helps drivers with critical decisions, such as lane changes, speed changes, overtaking speeds, and may be used to assist in parking as discussed herein. Low latency communications are used in V2X and are therefore suitable for precise relative positioning, e.g., using ranging signals, such as one way ranging, RTT, TDOA, etc.

In general, there are two modes of operation for V2X services, as defined in Third Generation Partnership Project (3GPP) TS 23.285. One mode of operation uses direct wireless communications between V2X entities, which may sometimes be referred to as sidelink communication. The other mode of operation uses network based wireless communication between entities. The two modes of operation may be combined, or other modes of operation may be used if desired.

The wireless communication system 100 may operate using direct or indirect wireless communications between the UE 102 and UE 104. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. Thus, as illustrated, UE 102 and UE 104 may directly communicate using with a Vehicle-to-Vehicle (V2V) communication link 103. UE 102 and UE 104 may similarly directly communicate with roadside unit (RSU) 110 via Vehicle-to-Infrastructure (V2I) communication links 107 and 109, respectively. The RSU 110 may include a backhaul connection to a network, illustrated by wired connection 111, but may via a wireless Uu interface to a base station. The RSU 110, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The RSU 110 may be used for ranging with UEs 102, 104, or other UEs, and because the position of the RSU 110 may be known precisely, the RSU 110 may be used as an anchor UE with which a position of the UE 102, 104 or other UEs may be determined. The RSU 110 may sometimes be referred to herein as UE 110. The UEs 102, 104 and UE 110 may communicate with additional entities, such as additional vehicles, RSUs or with a UE 112 held by pedestrian 114 using direct communication links. For example, UE 102 may communicate with UE 112 via V2V communication link 113, UE 104 may communicate with UE 112 via V2V communication link 115, and UE 110 may communicate with UE 112 via V2I communication link 117.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., ADAS or safety use cases.

In other implementations, UE 102 and UE 104 may indirectly communicate with each other, e.g., through the RSU 110 via the V2I communication links 107 and 109, respectively or through other network infrastructure (not shown), e.g., using cellular vehicle-to-everything (CV2X). For example, vehicles may communicate via a base station in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access.

UEs 102 and 104 may initiate and perform ranging/positioning sessions, including sending pre-PRS messages, broadcasting PRS, and sending post-PRS messages on links 103, 107, 109, 113 or 115, with which the range or relative positions between UEs 102 and 104 may be determined. The PRS broadcast by UEs 102 and 104 may be any signal suitable for ranging, e.g., as defined for DSRC or C-V2X. The PRS may be broadcast on a licensed or an unlicensed spectrum. For example, in some implementations, PRS may be broadcast on one or more Unlicensed National Information Infrastructure (UNIT) radio bands including, for example, one or more of the UNII-1 radio band, the UNII-2A radio band, the UNII-2B radio band, or the UNII-3 radio band. When broadcasting on unlicensed spectrum, listen-before-transmit (LBT) protocols may be employed.

Where UEs 102 and 104 broadcast PRS in a V2V link 103, the range or relative positions between UEs 102 and 104 may be determined directly. Where UE 102 and 104 broadcast PRS in V2I links 107 and 109 or via links 113 and 115, the range or relative positions between UE 102 and UE 110 or UE 112 and between UE 104 and UE 110 or UE 112 may be determined directly.

The direct wireless communications between the UE 102 and 104 and UE 110 and UE 112, do not require any network infrastructure and enable low latency communications, which is advantageous for precise ranging or positioning. Accordingly, such direct wireless communications may be desirable for ranging over short distances, e.g., with nearby vehicles or infrastructure.

The UEs, e.g., any of V-UE 102, V-UE 104, RSU 110, and UE 112, shown in FIG. 1, may be configured to perform ranging and/or positioning operations, such as RTT-based ranging.

Figure 2:
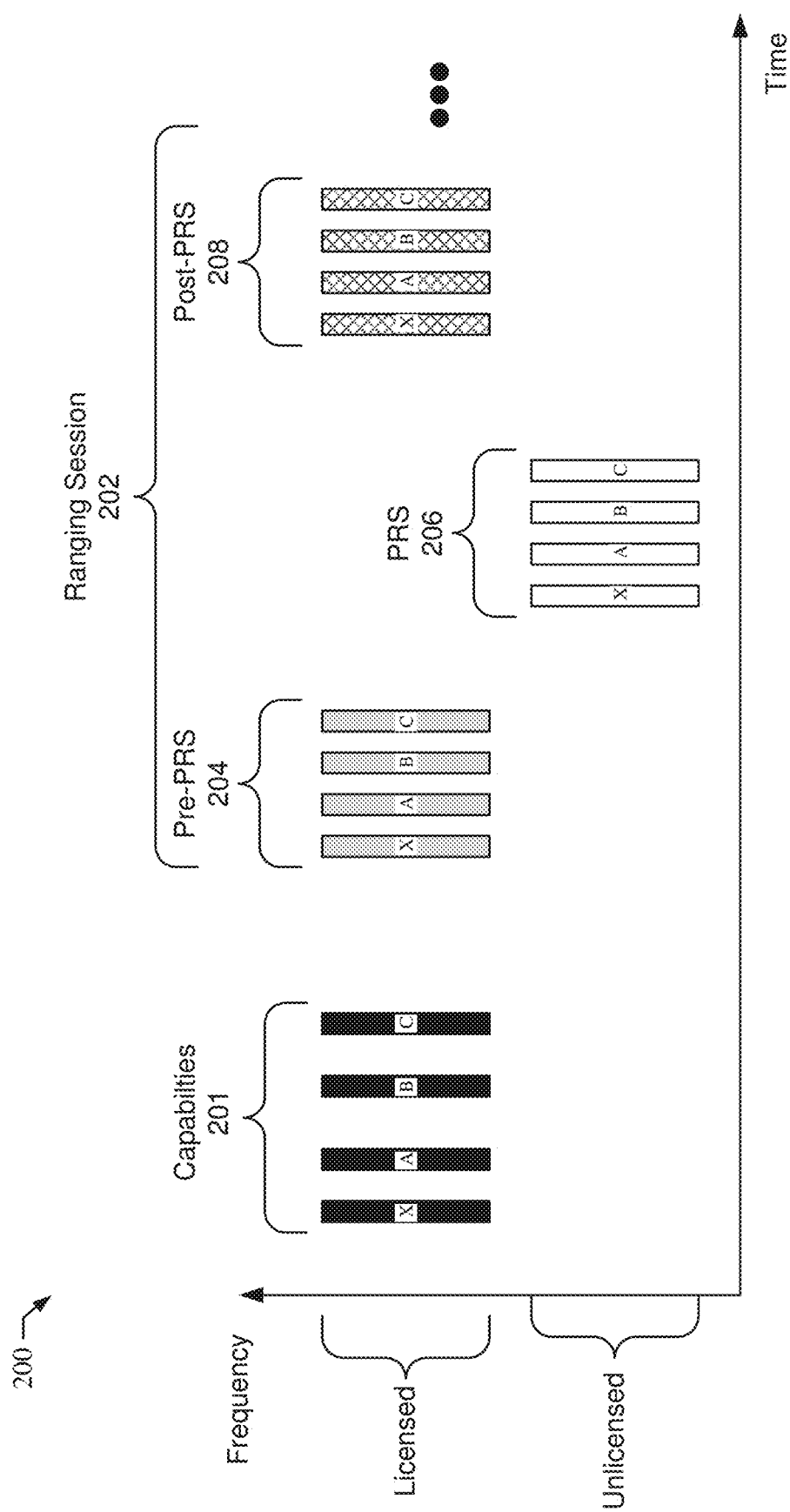
FIG. 2 illustrates a signaling graph indicating the timing and frequencies of various messages that may be sent and received by an initiating UE and three responder UEs for a ranging or positioning session.

FIG. 2 illustrates, by way of example, a signaling graph 200 indicating the timing and frequencies of various messages that may be sent and received by an initiator UE (UEX) and three responder UEs (UEA, UEB, and UEC) for a ranging or positioning session. For example, FIG. 2 illustrates capabilities messages 201 and an RTT-based ranging session 202, during which a number of messages are sent between an initiator UE and responder UEs, including pre-PRS messages 204 to request and accept a ranging session, the PRS signals 206 for measurement, and post-PRS messages 208 to exchange measurement payloads. Each set of pre-PRS 204, PRS 206, and post-PRS 208 may be considered a single unit or PRS cycle. Each PRS cycle includes a pre-PRS message 204, PRS signal 206, and post-PRS message 208, and may therefore be referred to herein as a ranging session 202. The ranging sessions (PRS cycles) may be periodic with a period T_r, and the capabilities messages may be periodic with a period T_c, where T_r>T_c. In FIG. 2, the signaling from the initiator UEX is labeled with "X," signaling from a first responder UEA is labeled with an "A," signaling from a second responder UEB is labeled with a "B," and signaling from a third responder UEC is labeled with a "C." The signaling from the initiator UEX is the first box in each of the pre-PRS messages 204, the PRS signals 206, and the post-PRS messages 208, and is followed by the responder UEs (UEA, UEB, and UEC).

As illustrated, the UEs, including the initiator UE and responder UEs, may broadcast capabilities messages 201. The capabilities messages are not part of the ranging session but may include information that may be used by the initiator UE to initiate a ranging session with selected UEs. For example, the capabilities message may be on the ITS spectrum and may include the UE ID, the ranging capability of the UE, the channel(s) that the UE is configured to use, MIMO (Multiple Input Multiple Output) capabilities, etc. The capabilities message may additionally indicate whether the UE needs to determine its position or if its position is known and it may serve as an anchor UE for positioning other UEs. It should be understood that while FIG. 2 illustrates the capabilities messages 201 as having the same order as the messages in the ranging session 202, the order may, in fact, differ.

The pre-PRS messages 204 (e.g., pre-ranging messages) are used by the UEs to request and acknowledge a ranging session. As illustrated, the pre-PRS messages 204 may be transmitted on a licensed spectrum to guarantee reliability. The pre-PRS messages 204 may be broadcast or unicast, e.g., with Radio Resource Control (RRC) connections. The initiator UEX broadcasts an initial pre-PRS message 204 (gray box labeled with X), sometimes referred to as a pre-PRS request message, to indicate the ranging session between the initiator UE and the responder UEs and which may provide information for the ranging session. For example, the pre-PRS message 204 from the initiator UE, may include IDs for participating UEs, i.e., the initiator and responder IDs. The pre-PRS request message may include a ranging session ID, the channel for the PRS broadcast by the initiator UEX and responder UEs, the PRS broadcast time, the maximum listen before transmit (LBT) time, etc. The pre-PRS request message from the initiator UEX for example may include a PRS ID that will be used by the initiator UE, and in some implementations, the PRS ID to be used by the responder UEs. If the PRS ID will be fixed over multiple PRS exchanges (e.g., for multiple units in the ranging session 202), the initiator UE may include an ID associated with the current PRS exchange, e.g., a session ID. The initiator UE may determine when the PRS signals 206 will be transmitted, which, for example, may be configured from an upper layer in the initiator UE. The initiator UE may indicate the timing of the PRS by sending the time slot number nears to the desired PRS transmission time. In some implementations, the time slot may be subject to local clock error. The initiator UE may further provide the timing of PRS to be sent by the responder UEs, as well as a maximum LBT time or other timing information. The initiator UE may further indicate the frequency band that will be used to broadcast the PRS signal 206 by the initiator UE and the responder UEs. For example, the frequency of PRS may be selected from an available set of total bandwidths or the frequency of PRS may be selected by sensing the interference and choosing one or more channels whose average interference Reference Signal Receive Power (RSRP) is less than a threshold. As discussed herein, the initiator UEX may dynamically alter the frequency band used by the initiator UE and responder UEs to broadcast PRS, e.g., based on accuracy determinations and in some implementations based on LBT success. The initiator UE may indicate the number of PRS cycles that it will execute during the ranging session 202. The number of PRS cycles may be configured from an upper layer. The pre-PRS message for each PRS cycle, for example, may indicate the current PRS cycle with respect to the total PRS cycles requested, where the number of the current cycle increments after completion of each cycle.

The initial pre-PRS request message from the initiator UE is received and decoded by the responder UEs, which are identified in the initial pre-PRS message. The responder UEs may send pre-PRS messages 204 (gray boxes labeled with A, B, C) acknowledging the initial pre-PRS request message, which may additionally provide information for the ranging session. Each responder UE may indicate the PRS ID that it will use or may indicate that it will use the PRS ID that was indicated in the initial pre-PRS message. If the PRS ID will be fixed over multiple PRS exchanges (e.g., multiple PRS cycles in the ranging session 202), the responder UE may include the ID associated with the current PRS exchange, e.g., a session ID, that was received in the initial pre-PRS message from the initiator UE. The responder UEs may broadcast the pre-PRS messages 204, which may be received by the initiator UE (and other responder UEs). In some implementations, each responder UE may transmit the pre-PRS message 204 using unicast with RRC connection to the initiator UE.

The PRS signals 206 are exchanged by the participating UEs. The initiator UE and responder UEs know the expected timing and frequencies of the PRS signals and know the PRS ID (and any session ID used with the exchanged) that is used to broadcast the PRS signals 206. The PRS signals 206 may be, for example, a Quadrature Phase Shift Keying (QPSK) modulated pseudo-noise (PN) sequence and may include the ranging session ID. The PRS signals 206 may be broadcast on a licensed spectrum or on an unlicensed spectrum, which may be subject to LBT constraints. In some implementations, when using the unlicensed spectrum, the initiator UEX may reserve the transmission for responder UEs UEA, UEB, and UEC, so that the responder UEs may not need to perform LBT for the PRS transmission. For example, the initiator UEX broadcasts its PRS signal 206 (white box labeled with X) at the determined time that was indicated in the initial pre-PRS message 204. In some implementations, the initiator UE broadcasts its PRS signal at the determined time plus a random waiting time due to the LBT constraints when the PRS signal is deployed in the unlicensed spectrum. In some implementations, the LBT may be a Category 2 LBT with a fixed window Clear Channel Assessment (CCA) or a Category 4 LBT with a varying window CCA. The initiator UE uses the PRS signal that corresponds to the PRS ID and uses the frequency resources that were indicated in its initial pre-PRS message 204. The initiator UE stores the time instance that the PRS signal is broadcast, and the responder UEs store the time instance that the PRS signal is received. In some implementations, the time instances may be subject to local clock error.

Similar to the initiator UE, each responder UE broadcasts its PRS signal 206 (white boxes labeled with A, B, and C) at the time and frequencies that were assigned in the initial pre-PRS message 204 by the initiator UE. In some implementations, each responder UE may broadcast its PRS signal at the determined time plus a random waiting time due to the LBT constraints when the PRS signal is deployed in the unlicensed spectrum. The LBT may be a Category 2 LBT with a fixed window CCA or a Category 4 LBT with a varying window CCA. In some instances, the LBT procedure may fail and after the waiting time the responder UE will not be able to broadcast its PRS signal. If the LBT procedure is successful (or not used, e.g., because the PRS signal is broadcast on a licensed spectrum or the initiator UE reserved the transmission times for the responder UEs), each responder UE uses the PRS signal that corresponds to the PRS ID and uses the frequency resources that were indicated in the initial pre-PRS request message 204. Each responder UE stores the time instance that its PRS signal is broadcast, and the initiator UE (and optionally other responder UEs) stores the time instance that the PRS signal is received. In some implementations, the time instances may be subject to local clock error.

Thus, each UE records the time of departure (ToD) of its broadcast PRS signal and measures the time of arrival (ToA) of the PRS signal received from the other UEs. The PRS signal may be any signal suitable for ranging, e.g., as defined for DSRC or C-V2X. The ToA and ToD resolution of the PRS signals increase with an increased frequency bandwidth. In some implementations, the angle of departure (AoD) and angle of arrival (AoA) of the broadcast and received PRS signals may also be measured. Broadcasting on an unlicensed spectrum is advantageous as a wider frequency band is available. For example, in some implementations, PRS may be broadcast on one or more UNIT radio bands including, for example, one or more of the UNII-1 radio band, the UNII-2A radio band, the UNII-2B radio band, or the UNII-3 radio band.

The post-PRS messages 208 are sent by each UE to exchange measurement payloads. As illustrated, the post-PRS messages 208 may be transmitted on a licensed spectrum to guarantee reliability. In some implementations, the post-PRS messages 208 may be broadcast or unicast with RRC connection. The initiator UEX sends its post-PRS message 208 (hatched box labeled with X) and indicates when it broadcast the PRS signal 206 (ToD) and when the PRS signals from the responder UEs were received (ToA). In some implementations, the ToA may be computed as a relative time with respect to the ToD of its broadcast PRS signal, and the relative time may be provided. In some implementations, the relative time may be approximated to the closest multiple of time scale shared by the initiator UE and the responder UEs. In some implementations, the initiator UE may provide an indication of its location in the post-PRS message 208, if known. For example, the location of the initiator UE may be the location at a specific time, such as the broadcast time of its PRS signal or the arrival time of the PRS signal from a responder UE. The post-PRS message 208 may further include the AoD of its PRS signal 206 and the AoA of the PRS signals 206 received from the responder UEs, the orientation of initiator UE, a broadcast indicator of the PRS signal 206, a reception indicator of PRS from the responder UEs, as well as other related measurements, e.g., including map information, the locations of reflectors with respect to the UE, etc.

Similar to the initiator UE, each responder UEs sends its post-PRS signal 208 (hatched boxes labeled with A, B, C) to provide the measurement payloads. Each responder UE may indicate whether it received the PRS signal from the initiator UE and may indicate when it broadcast the PRS signal 206 (ToD) and when the PRS signals from the initial UE (and optionally from other responder UEs) was received (ToA). In some implementations, the ToD may be computed as a relative time with respect to the ToA of the PRS signal from the initiator UE (and optionally with respect to the ToA of the PRS from other responder UEs). In some implementations, the relative time may be approximated to the closest multiple of time scale shared by the initiator UE and the responder UE. In some implementations, the responder UE may provide an indication of its location in the post-PRS message 208, if known. For example, the location of the responder UE provided may be the location at a specific time, such as the arrival time of PRS signal from the initiator UE or the departure time of its broadcast PRS signal. The post-PRS message 208 may further include the AoD of its PRS signal 206 and the AoA of the PRS signals 206 received from the initiator UEX (and optionally received from the other responder UEs), the orientation of initiator UE, a broadcast indicator of the PRS signal 206, a reception indicator of PRS from the responder UEs, as well as other related measurements, e.g., including map information, the locations of reflectors with respect to the UE, etc. As discussed herein, the post-PRS messages 208 transmitted by the responder UEs may further include information related to determined accuracies of ranging sessions and optionally to the success rate of the LBT process.

After receiving the post-PRS messages, the initiator UE (and responder UEs) may compute its range (and in some implementations its location), e.g., using a Kalman filter. The initiator UE may transmit the next cycle of pre-PRS messages at a time that is indicated by an upper layer or that is autonomously determined by the initiator UE.

The time between the first pre-PRS message 204 and the last post-PRS message 208 may be the duration of the ranging session and may be, e.g., 100 msec. The duration of each broadcast PRS signals 206 may be, e.g., 47 μsec. In some implementations, multiple PRS cycles, e.g., multiple instances of pre-PRS messages 204, PRS 206, and post-PRS messages 208, may be used together to provide higher accuracy.

Both the initiator UE and the responder UEs may determine the range between itself and each other UE in the ranging session based on the ToD and the ToA of the broadcast PRS signals. For example, the RTT between any pair of UEs (which may be any pair of initiator and responder UEs) may be determined based on the $ToD_i$ and $ToA_i$ for the $PRS_i$ signals (where i=1 for PRS broadcast from a first UE and i=2 for PRS broadcast by a second UE), as the difference between the $ToD_1$ and $ToA_2$ minus the difference between the $ToA_1$ and the $ToD_2$, e.g., as follows.

$$RTT = (ToD_1 - ToA_2) - (ToA_1 - ToD_2) \qquad \text{eq. 1}$$

The RTT value is the round-trip time for the signal, and thus, the range (distance) between the $UE_1$ and $UE_2$ may be determined as RTT/2c, where c is the speed of light.

If the position of one or more responder UEs is known, the range between the initiator UE and the responder UEs may be used along with the known position of the one of the responder UE to determine the position of the other UE, and thus, the ranging session may be a positioning session. The responder UEs with known positions that may be used for positioning may sometimes be referred to herein as anchor UEs. The positions of anchor UEs may be provided to other UEs through messaging, e.g., in the pre-PRS messages or in the post-PRS messages. If the range to multiple anchor UEs is determined, the positions of the multiple anchor UEs may be used in multilateration to determine the position of the initiator UE (or other responder UEs).

The angle measurements, e.g., AoD, and AoA, may be used, e.g., for assistance in positioning. By way of example, based on the range between two UEs and a measured AoA, the relative positions of the two UEs may be determined. With the relative positions of the UEs determined, if the actual position of one of the UEs is known (which may be provided, e.g., in the pre-PRS messages 204 or post-PRS messages 208), the actual position of the other UE may be determined. If the position of two UEs are known by a third UE, the ranges between the third UE and each of the other two UEs will produce two possible positions for the third UE, which may be resolved based on AoD/AoA information. The AoD may be useful if the resolution of the AoA is poor or incorrect, for example. AoD may be measured, e.g., based on a known orientation of the UE (for example, determined by a magnetometer), and the direction of the transmitted signal relative to the UE (e.g., relative to an antenna array of the UE used for beamforming). The AoA may be measured based on the phase difference of a received signal at different antenna elements of an antenna array and the known orientation of the UE, for example determined by a magnetometer). Additionally, geographic constraints may be used to assist in positioning, for example, by constraining possible positions of a vehicle based on positions that are accessible to a vehicle, such as a road.

Figure 3:
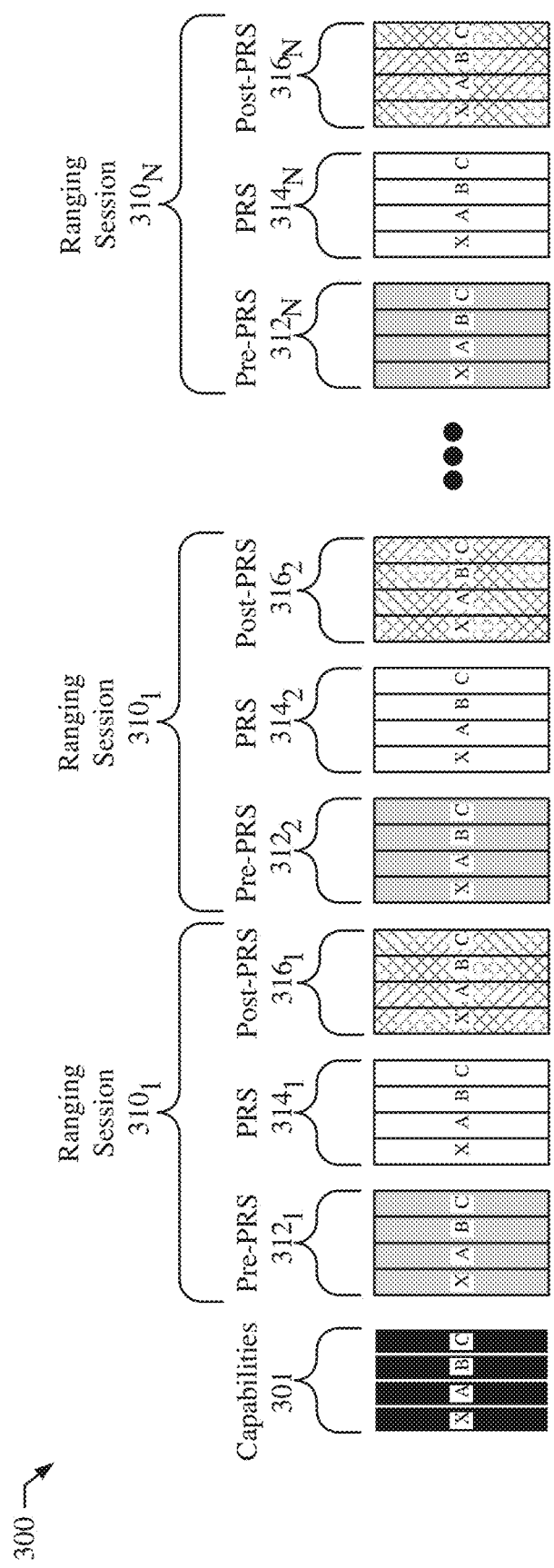
FIG. 3 illustrates a signaling graph showing a number of ranging sessions over a period of time.

FIG. 3, by way of example, illustrates a signaling graph 300 showing a number of ranging sessions including the initiator UEX and responder UEA, UEB, and UEC over a period of time. As illustrated, capabilities messages 301 may be exchanged followed by a series of ranging sessions $310_1$, $310_2$, ... $310_N$, sometimes collectively referred to as ranging sessions 310. As illustrated, each ranging session $310_1$, $310_2$, ... $310_N$ includes respective pre-PRS messages $312_1$, $312_2$, ... $312_N$, PRS signals $314_1$, $314_2$, ... $314_N$, and post-PRS messages $316_1$, $316_2$, ... $316_N$, which are transmitted by initiator UEX (labeled with X) or responder UEA (labeled with A), UEB (labeled with B), and UEC (labeled with C). Additional UEs may participate in the ranging sessions. It should be understood that equivalently, the ranging sessions 310 may be considered separate PRS cycles within a single ranging session. The ranging sessions 310 (PRS cycles) may be periodic with a period T_r, and the capabilities messages may be periodic with a period T_c, where T_r >T_c.

As discussed above, the accuracy of the determined ranges between transmitting UEs, and thus, position estimates that rely on the ranges, is related to the size of the frequency bands used to transmit the PRS signals. For example, PRS signals transmitted using larger frequency bands will, in general, produce a more accurate range estimate, than PRS signals transmitted using smaller frequency bands. In a distributed ranging system, however, there is no centralized control of the PRS bandwidths to be used in ranging sessions. For example, there may be multiple contemporaneous ranging sessions competing for PRS resources, e.g., timing and frequencies. Thus, there may be limited frequency resources available, particularly, on licensed spectrum. Moreover, while an unlicensed spectrum may have greater available frequency resources, LBT procedures failure rates may increase when a large frequency band is used for PRS transmissions. Without a centralized control of the PRS bandwidths, it is desirable for the UEs engaged in a ranging session to dynamically control the size of the bandwidth used for PRS signals to improve accuracy performance, but without interfering with other ranging sessions, and without increasing LBT failure rates, which may offset any gains in accuracy performance.

Figure 4A:
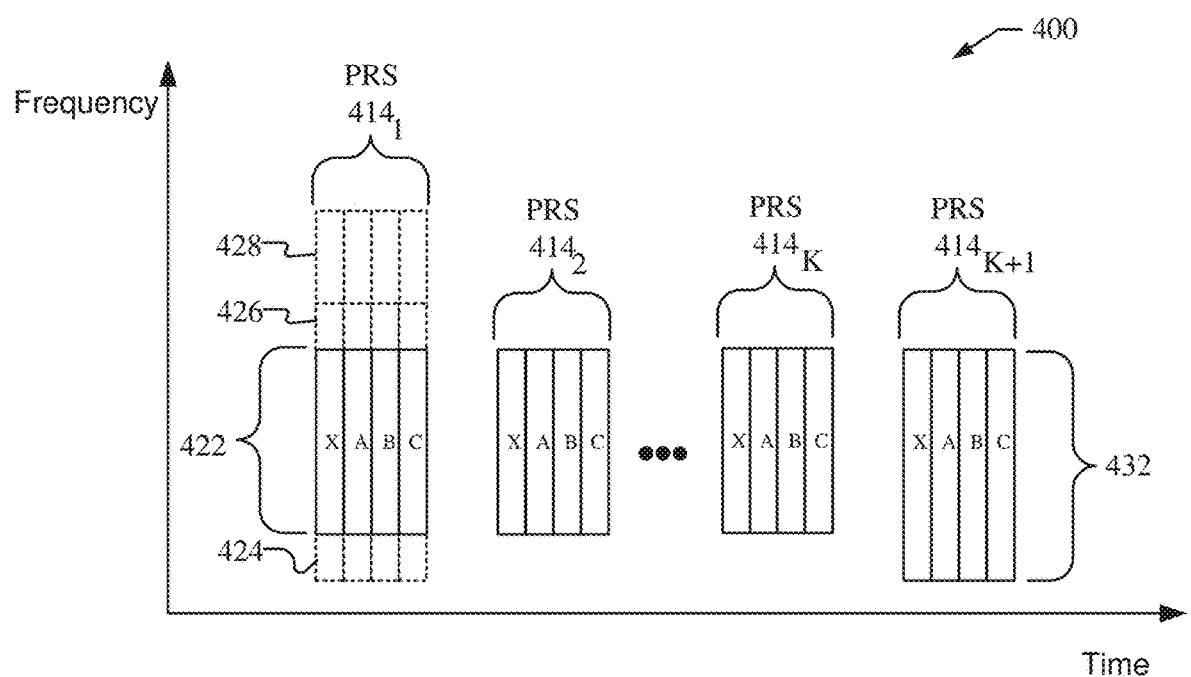
FIG. 4A is a graph illustrating dynamic control of the frequency range used with PRS signals over multiple ranging sessions based on the accuracy of determined ranges.

FIG. 4A is a graph 400 illustrating dynamic control of the frequency range used with PRS signals over multiple ranging sessions based on the accuracy of determined ranges. FIG. 4A, for example, illustrates the PRS signals $414_1$, $414_2$, ..., $414_K$ and $414_{K+1}$, sometimes collectively referred to as PRS signals 414, transmitted by initiator UEX (labeled with X) or responder UEA (labeled with A), UEB (labeled with B), and UEC (labeled with C), in a number (K+1) of ranging sessions, and the pre-PRS messages and post-PRS messages in the ranging sessions are not illustrated in FIG. 4A.

The initiator UEX may initiate ranging sessions that use a first frequency bandwidth for the PRS signals for a number of ranging sessions. For example, as illustrated in FIG. 4A, PRS signals $414_1$, $414_2$, ..., $414_K$ may use a first frequency bandwidth 422. As illustrated by the dotted lines, additionally or alternative frequency bandwidths 424, 426, and 428 may be available for use in the licensed or unlicensed spectrum used with the PRS signals 414. The UEs participating the ranging sessions, e.g., UEX, UEA, UEB, and UEC, may continuously or periodically monitor the accuracy of the ranges determined using PRS signals over a number (K) of ranging sessions, e.g., to generate an indication of the accuracy of the ranging over the number (K) of ranging sessions. The number (K) of ranging sessions over which the accuracy of the ranging is determined may be determined as a function of the speed of the initiator UEX. For example, if the speed of the initiator UEX is high, the number K of ranging sessions may be relatively low to minimize the distance that the initiator UEX travels using low accuracy ranging before an adjustment is made, and conversely if the speed of the initiator UEX is low, the number (K) of ranging sessions may be relatively high to improve results of the accuracy determination. The initiator UEX may provide an indication of the number (K) of ranging sessions to responder UEs in the pre-PRS message, post-PRS message, or in some implementations. The indication of the number (K) of ranging sessions may be the speed of the initiator UEX or the value of K. In some implementations, the responder UEs may independently determine the speed of the initiator UEX and/or the number (K) of ranging sessions, e.g., based on the responder UEs speed (which may be zero where the UE is stationary), and the change over time in the range between the initiator UEX and the responder UE or reported positions of the initiator UEX (e.g., reported in the post-PRS messages), as well as known geographic constraints such as constraining possible relative positions of the initiator UEX to the responder UE based on positions that are accessible to a vehicle, such as a road.

By way of example, the accuracy of the ranging over the number (K) of ranging sessions may be determined by a UE based on the variance of its derived ranging values over the number (K) of ranging sessions. The variance, for example, may be determined as the average squared deviation of each number (range) from the mean of the data set over the number (K) ranging sessions. The initiator UEX, for example, may determine the variances in the determined ranges to each responder UE over the over the number (K) of ranging sessions. The responder UEs may determine the variance in the determined range to the initiator UE over the over the number (K) of ranging sessions. In some implementations, the responder UEs may additionally determine variances in the determined ranges to other responder UEs over the over the number (K) of ranging sessions. Each determined variance may be compared to a predetermined threshold, e.g., an accuracy threshold α. For example, a variance that is greater than the accuracy threshold α may indicate that the ranges determined over the number (K) of ranging sessions have low accuracy. The accuracy of the ranging by a UE participating in the ranging sessions may be flagged if it is determined to be low, e.g., based on the variance being greater than the accuracy threshold α, or equivalent if the accuracy is determined to be high, e.g., based on the variance being less than the accuracy threshold α. If desired, other techniques may be used to determine the accuracy of the ranging. For example, instead of variance, other statistical analysis may be used to determine the accuracy of the ranging, such as the use of standard deviation.

The accuracy threshold α may be a function of the speed of the initiator UEX. For example, the accuracy threshold α may be set relatively low if the speed of the initiator UEX is high, i.e., as a high degree of accuracy may be desirable while the initiator UEX is moving rapidly, and conversely the accuracy threshold α may be set relatively high if the speed of the initiator UEX is low, as a high degree of accuracy may not be necessary when the initiator UEX is moving slowly or stopped. Similar to the indication of the number (K) of ranging sessions provided to the responder UEs, the initiator UEX may provide an indication of the accuracy threshold α, e.g., as the speed of the initiator UEX or the value of accuracy threshold α, or the responder UEs may independently determine the speed of the initiator UEX and/or the accuracy threshold α.

The responder UEs may send an indication of the accuracy of the ranging over the number (K) of ranging sessions to the initiator UEX. For example, the responder UEs may send a message that includes a flag indicating low accuracy ranging (or equivalently a flag indicating high accuracy ranging). In some implementations, the responder UEs may send the determined variance (or other metric of the accuracy of the ranging) and the initiator UEX may compare the variance from each responder UE to the accuracy threshold α to flag the accuracy of the ranging from each responder UE as low accuracy (or equivalently as high accuracy).

In one implementation, the responder UEs may send the indication of the accuracy of the ranging over the number (K) of ranging sessions to the initiator UEX in a message that is separate and independent from the ranging sessions, i.e., not part of the pre-PRS message, PRS signal, or post-PRS message. For example, the message reporting the accuracy of ranging may be transmitted on the ITS spectrum. In some implementations, to reduce overhead, the message reporting the accuracy of ranging may be sent with a periodicity T_a that is greater than the periodicity of the ranging sessions T_r, i.e., T_a>T_r. By way of example, the message reporting the accuracy of ranging may sent every K ranging sessions or may be sent more frequently than K ranging sessions.

In another implementation, the responder UEs may send the indication of the accuracy of the ranging over the number (K) of ranging sessions to the initiator UEX in the post-PRS message in each ranging session. For example, the indication of the accuracy of the ranging over the previous K ranging sessions may be included in a message field in each post-PRS message. Thus, the messages reporting the accuracy of ranging may have a periodicity T_a that is the same as the periodicity of the ranging sessions T_r, i.e., T_a=T_r.

The initiator UEX may use the indication of the accuracy of the ranging determined by itself (e.g., with respect to each responder UE) and from the responder UEs (e.g., with respect to the initiator UE, and in some implementations with respect to other responder UEs) to determine whether to increase the frequency range of the PRS signals. For example, the initiator UEX may determine a number of low accuracy indications from all participating UEs and may determine to increase the bandwidth of the PRS in subsequent ranging sessions using the number of low accuracy indications, e.g., by determining if the number of low accuracy indications is above or below a threshold. For example, in one implementation, the initiator UEX may determine an average number of low accuracy indications (e.g., total number of accuracy indications flagged as low accuracy divided by the total number of ranges determined by participating UEs) and compare the average number of low accuracy indications to a threshold, e.g., an increase threshold β, and may increase the frequency range of the PRS signals if the average number of low accuracy indications is greater than the increase threshold β. The increase threshold β may be determined as a function of the accuracy requirements for the ranging or positioning application. For example, if the ranging or positioning application requires high accuracy ranging/positioning, the increase threshold β may be set relatively low (e.g., closer to 0) and, conversely, if the ranging or positioning application does not require high accuracy ranging/positioning, the increase threshold β may be set relatively high (e.g., closer to 1).

Thus, if the average number of low accuracy indications is greater than the increase threshold β, the initiator UE may increase the frequency range of the PRS signals in subsequent ranging sessions. For example, referring to FIG. 4A, after K ranging sessions, the initiator UEX may determine the frequency range of the PRS signals should be increased based on the indications of the accuracy of the ranging from participating UEs in ranging sessions 1-K. Accordingly, in the pre-PRS request message for the K+1 ranging session, the initiator UEX indicates that the initiator UEX and the responder UEs will use a second frequency bandwidth 432 for the PRS $414_{K+1}$ that is greater than the first frequency bandwidth 422 used in PRS $414_1$-PRS $414_K$. The frequency bandwidth may be increased in discrete steps, e.g., with a first increase (illustrated in PRS $414_{K+1}$) increasing by a discrete number of bandwidths 424. In subsequent ranging sessions, if the accuracy of ranging continues to be determined to be low, additional bandwidths, e.g., bandwidths 426 and 428, may be incrementally added.

Figure 4B:
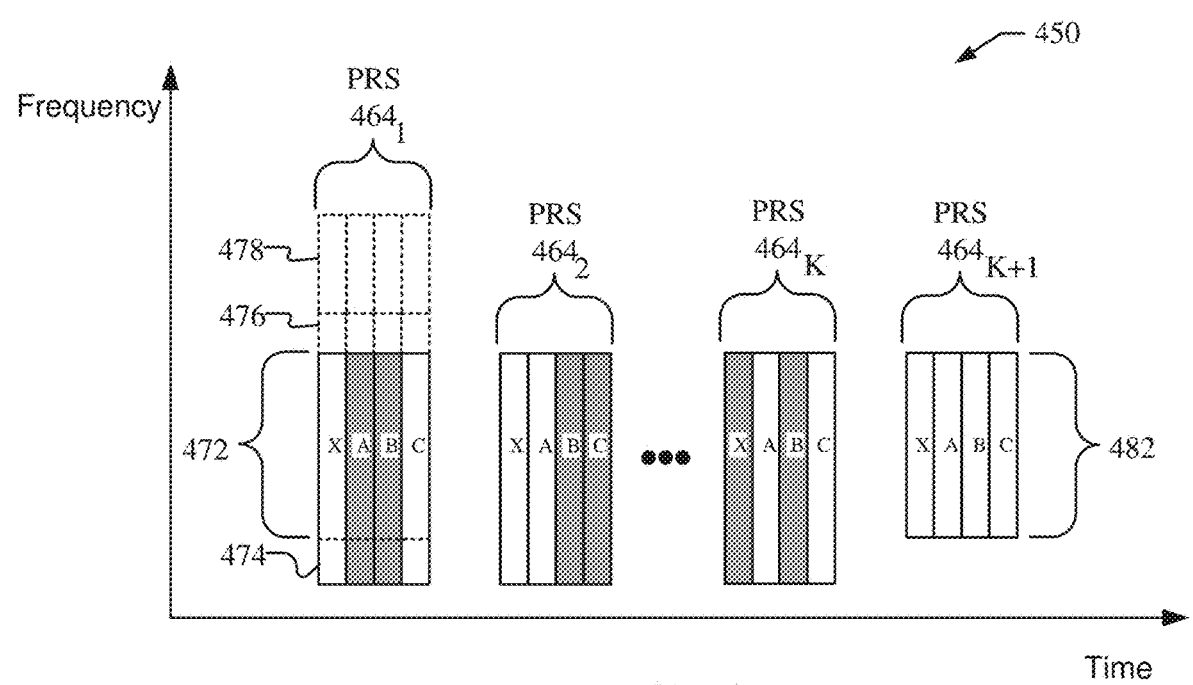
FIG. 4B is a graph illustrating dynamic control of the frequency range used with PRS signals over multiple ranging sessions based on the probability of successful Listen Before Transmit (LBT) procedures.

FIG. 4B is a graph 450 illustrating dynamic control of the frequency range used with PRS signals over multiple ranging sessions based on the probability of LBT success. The dynamic control of the frequency range used with PRS signals based on LBT success may be in addition to or an alternative to the dynamic control of the frequency range used with PRS signals based on accuracy of ranging illustrated in FIG. 4A. FIG. 4B, for example, illustrates the PRS signals $464_1$, $464_2$, . . . , $464_K$ and $464_{K+1}$, sometimes collectively referred to as PRS signals 464, transmitted by initiator UEX (labeled with X) or responder UEA (labeled with A), UEB (labeled with B), and UEC (labeled with C), in a number (K+1) of ranging sessions, and the pre-PRS messages and post-PRS messages in the ranging sessions are not illustrated in FIG. 4B. In FIG. 4B, the PRS signals 464 are broadcast over an unlicensed spectrum using LBT procedures. Successful broadcast of PRS signals 464 are illustrated in FIG. 4B with white boxes, while unsuccessful broadcast of PRS signals 464 due to an LBT failure are illustrated with dark gray boxes.

As illustrated in FIG. 4B, the initiator UEX may initiate ranging sessions that use a first frequency bandwidth 472 for the PRS signals $464_1$, $464_2$, . . . , $464_K$. As illustrated by the dotted lines, additionally or alternative frequency bandwidths 474, 476, and 478 may be available in the unlicensed spectrum, e.g., to decrease the frequency bandwidth 472, as illustrated by bandwidths 474, or to increase the frequency bandwidth 474, as illustrated by bandwidths 476 and 478.

The UEs participating in the ranging sessions, e.g., one or more of the initiator UEX, the responder UEs, e.g., UEA, UEB, and UEC, or a combination thereof, may monitor and record the number of LBT successes (or equivalently the failures) resulting in PRS transmissions over the number (K) of ranging sessions, e.g., to generate an indication of successful LBT procedures over the number (K) of ranging sessions. As discussed above, the number (K) of ranging sessions may be determined as a function of the speed of the initiator UEX. For example, an average number of successful LBT procedures may be determined based on the number of successful LBT procedures recorded by a UE (e.g., resulting in transmission of PRS by the UE illustrated in FIG. 4B with white boxes) divided by the number ranging sessions, e.g., K ranging sessions. The average number of successful LBT procedures may be compared to a predetermined threshold, e.g., success threshold γ. For example, a UE may flag its LBT procedures over the number (K) ranging sessions as low probability if the determined number of LBT successes (e.g., the average successful LBT procedures) for the UE is less than the success threshold γ. The success threshold γ may be set based on the number of responder UEs (or equivalently the number of participating UEs, which is merely the number of responder UEs plus the initiator UE). The number of responder UEs may be determined by each participating UE based on the responder UE IDs provided in the pre-PRS request message from the initiator UE if broadcast, or may be included in the pre-PRS request message from the initiator UE if unicast. For example, the success threshold γ may be set relatively high if there is a large number of responder UEs and may be set relatively low if there is a lower number of responder UEs.

The responder UEs may send an indication of successful LBT procedures over the number (K) of ranging sessions to the initiator UEX. The message including the indication of successful LBT procedures for example, may include a flag indicating low probability success (or equivalently a flag indicating high probability success). In some implementations, the responder UEs may send the average number of successful LBT procedures (or another metric of the LBT success) and the initiator UEX may compare the average number of successful LBT procedures to the success threshold γ to flag any responder UEs as having low probability LBT success (or equivalently as high probability).

The responder UEs may include the indication of successful LBT procedures in the same message as the indication of the accuracy of ranging discussed in FIG. 4A. Thus, for example, the message with the indication of successful LBT procedures may be in a message that is separate and independent from the ranging sessions, which may have a periodicity that is greater than the periodicity of the ranging sessions or may be included in the post-PRS messages with the same periodicity as the ranging sessions.

The initiator UEX may use the indication of successful LBT procedures determined by itself, or received from each responder UEs, or a combination thereof, to determine whether to decrease the frequency range of the PRS signals. For example, in one implementation, the initiator UEX may determine whether to decrease the bandwidth of the PRS in subsequent ranging sessions based on the indications of indications of successful LBT procedures determined by itself. For example, if the initiator UEX flags its LBT procedures over the number (K) ranging sessions as low probability based on the number of LBT successes (e.g., the average successful LBT procedures) for the initiator UEX being less than the success threshold γ, then the initiator UEX may determine to decrease the bandwidth of the PRS in subsequent ranging sessions.

In another implementation, the initiator UEX may receive indications of successful LBT procedures from one or more responder UEs (e.g., the responder UEs may send an indication only if its LBT procedures are flagged as low probability). The initiator UEX may determine a number of responder UEs with low probability LBT success and may determine to decrease the bandwidth of the PRS in subsequent ranging sessions using the number of responder UEs with low probability LBT success, e.g., by determining if the number of responder UEs with low probability LBT success is above or below a threshold. For example, in one implementation, the initiator UEX may determine an average number of low probability LBT success (e.g., total number of responder UEs with low probability LBT success divided by the total number of responder UEs) and compare the average number of low probability LBT success to a threshold, e.g., a UE threshold δ, and may decrease the frequency range of the PRS signals if the average number of responder UEs with low probability LBT success is greater than the UE threshold δ. The UE threshold δ may be determined as a function of the number of responder UEs (or equivalently the number of participating UEs, which is merely the number of responder UEs plus the initiator UE). The number of responder UEs may be determined by each participating UE based on the responder UE IDs provided in the pre-PRS request message from the initiator UE if broadcast, or may be included in the pre-PRS request message from the initiator UE if unicast. For example, the UE threshold δ may be set relatively high if there is a large number of responder UEs and may be set relatively low if there is a lower number of responder UEs.

In another implementation, the initiator UE may additionally include itself along with the responder UEs in the determination of the number of UEs with low probability LBT success. For example, the initiator UE may compare the total number of UEs (including the initiator UE and the responder UEs) with low probability LBT success and may determine to decrease the bandwidth of the PRS in subsequent ranging sessions using the number of UEs with low probability LBT success, e.g., by determining if the number of UEs with low probability LBT success is above or below a threshold that is based on the total number of participating UEs.

The initiator UEX may, thus, determine to decrease the frequency range of the PRS signals in subsequent ranging sessions based on the LBT success of itself, the responder UEs, or a combination thereof. For example, referring to FIG. 4B, after K ranging sessions, the initiator UEX may determine that the frequency range of the PRS signals should be decreased based on the LBT success over in ranging sessions 1-K. Accordingly, in the pre-PRS request message for the K+1 ranging session, the initiator UEX indicates that the initiator UEX and the responder UEs will use a second frequency bandwidth 482 for the PRS 464$_{K+1}$ that is less than the first frequency bandwidth 472 used in PRS 464$_1$-PRS 464$_K$. The frequency bandwidth may be decreased in discrete steps, e.g., with a first increase (illustrated in PRS 464$_{K+1}$) decreasing by a discrete number of bandwidths 474. In subsequent ranging sessions, if the LBT success continues to be determined to be low, additional bandwidths may be incrementally decreased. Moreover, it should be understood that the decrease in the bandwidths of the PRS due to low probability of LBT success may be offset by the increase in the bandwidths of PRS due to low accuracy of ranging, as discussed in FIG. 4A.

Figure 5:
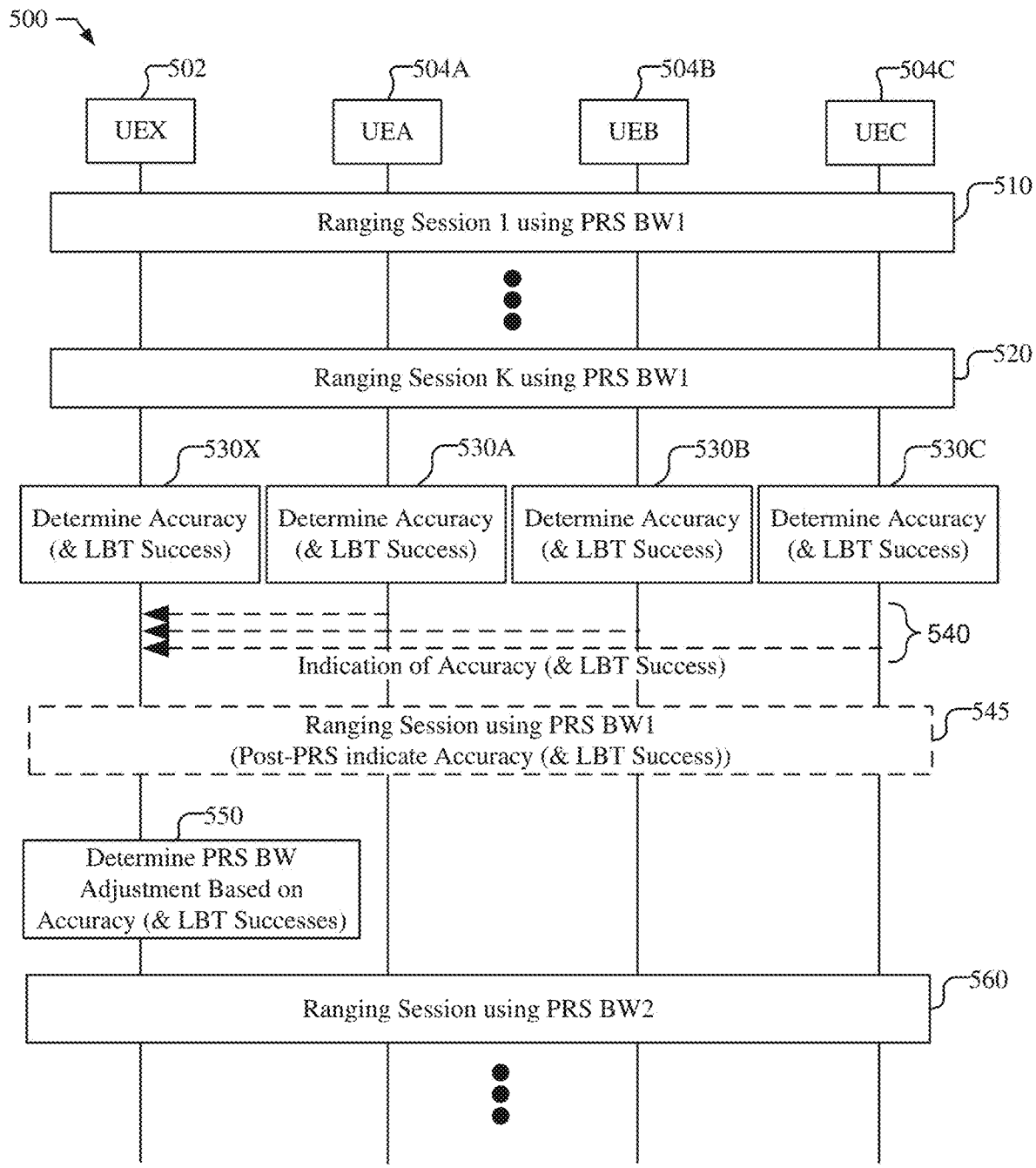
FIG. 5 illustrates a signaling flow in which the frequency range used with PRS signals over multiple ranging sessions is dynamically controlled based on the accuracy of determined ranges or the probability of LBT success.

FIG. 5 illustrates an example of a signaling flow 500 in which the frequency range used with PRS signals over multiple ranging sessions is dynamically controlled based on the accuracy of determined ranges and/or the probability of LBT success, as discussed herein. The initiator UEX 502 and responder UEA 504A, UEB 504B, and UEC 504C (sometimes collectively referred to as responder UEs 504) may be one or more of the vehicle based UEs (V-UE) 102 and 104, RSU 110 or UE 112, as described in FIG. 1. It should be understood that FIG. 5 illustrates the signaling for ranging procedures involving three responder UEs 504, but additional responder UEs may be present, which would involve additional communications and stages similar to that shown in FIG. 5. The communications between the UEs 502 and 504 in FIG. 5 may be direct communications between the entities and may not involve infrastructure devices, such as base stations, to forward the messages between the entities.

At stage 510, a first ranging session is performed between the UEs 502 and 504 using a first PRS bandwidth (BW1). The ranging session, for example, may include pre-PRS messages, PRS signals, and post-PRS messages between the initiator UEX 502 and the responder UEs 504, e.g., as described in FIG. 2. The initiator UEX 502, for example, may send a pre-PRS message to the responder UEs 504 that identifies the first PRS bandwidth (BW1) to be used in the ranging session. Each of the UEs 502 and 504 may determine the range between transmitting UEs, e.g., e.g., the initiator UEX 502 determines the range to each responder UE 504, each responder UE 504 determines a range to the initiator UEX 502 and in some implementations determines a range to each other responder UE 504. Additionally, in some implementations, known positions of anchor UEs may be provided, e.g., in post-PRS messages, and the position of the initiator UEX 502 (and any responder UE 504 with an unknown position) may be determined, e.g., using multilateration, as well as any additional information, such as AoA or AoD of the PRS signals or positions and ranges, or geographic information, such as street locations, etc.

A plurality of ranging sessions, similar to stage 510 may be performed between the UEs 502 and 504 using a first PRS bandwidth (BW1). For example, at stage 520, the K$^{th}$ ranging session is performed between the UEs 502 and 504 using a first PRS bandwidth (BW1).

At stage 530X, the initiator UEX 502 may determine the accuracy of the ranging and/or the LBT success (e.g., if the PRS is transmitted on an unlicensed spectrum), e.g., as discussed in reference to FIGS. 4A and 4B. For example, as discussed in FIG. 4A, the accuracy of the ranging may be determined based on variances in the determined ranges to each responder UE 504 over the number (K) of ranging sessions. The variance in the ranges to each responder UE 504 may be compared to the accuracy threshold α to determine whether the respective variance should be flagged indicating low accuracy ranges of the K ranging sessions. As discussed above, the value of K and the accuracy threshold α may be based on the speed of the initiator UEX 502.

As discussed in FIG. 4B, if the PRS is broadcast over an unlicensed spectrum and an LBT procedure is used, the initiator UEX 502 may further determine an indication of the LBT success in the PRS transmissions. For example, initiator UEX 502 may determine the number of successful LBT procedures (e.g., the number of successful transmissions of the PRS) in the number (K) of ranging sessions. An average number of successful LBT procedures may be determined, e.g., by dividing the number of successful LBT procedures by the number of PRS transmissions by the initiator UEX 502 in the K ranging sessions. The average number of successful LBT procedures may be compared to the success threshold γ to determine whether the initiator UE has a low probability of successful LBT procedures, e.g., if the average number of LBT successes for the initiator UEX 502 is less than the success threshold γ. The success threshold γ may be set based on the number of responder UEs 504.

At each of stages 530A, 530B, and 530C, the responder UEA, UEB, and UEC, respectively, may determine the accuracy of the ranging and/or the LBT success (e.g., if the PRS is transmitted on an unlicensed spectrum), e.g., as discussed in reference to FIGS. 4A and 4B, and similar to the discussion in stage 530X. For example, as discussed in FIG. 4A, the accuracy of the ranging may be determined based on variances in the determined ranges from a responder UE 504 to the initiator UEX 502 over the number (K) of ranging sessions. In some implementations, variances in determined ranges between responder UEs 504 also be determined. The variance in the ranges to the initiator UEX 502 (and optionally to other responder UEs 504) may be compared to the accuracy threshold α, to determine whether the respective variance should be flagged indicating low accuracy ranges of the K ranging sessions. As discussed above, the value of K and the accuracy threshold α may be based on the speed of the initiator UEX 502, and may be provided by the UEX 502 in the pre-PRS messages or independently determined by the responder UEs 504. Where variances between responder UEs 504 are determined, the accuracy threshold used to flag low accuracy ranging may be based on the speed of the responder UE 504.

Further, as discussed in FIG. 4B, if the PRS is broadcast over an unlicensed spectrum and the responder UEs 504 perform LBT procedures, the responder UEs 504 may further determine an indication of the LBT success in the PRS transmissions. For example, each responder UE may determine the number of successful LBT procedures (e.g., the number of successful transmissions of the PRS) in the number (K) of ranging sessions. An average number of successful LBT procedures may be determined, e.g., by dividing the number of successful LBT procedures by the number of PRS transmissions by the responder UE 504 in the K ranging sessions. The average number of successful LBT procedures may be compared to the success threshold γ to determine whether the responder UE 504 has a low probability of successful LBT procedures, e.g., if the average number of LBT successes for the responder UE 504 is less than the success threshold γ. The success threshold gamma γ may be set based on the number of responder UEs 504.

One or more of the responder UEs 504 provide an indication of the determined accuracy of ranging (and optionally of the LBT success probability, if determined) to the initiator UEX 502. The responder UEs 504, for example, may only provide an indication to the initiator UEX 502 if the ranging is determined to be low accuracy (or equivalently if the ranging is determined to be high accuracy), or each responder UE 504 may provide an indication to the initiator UEX 502 indicating whether the ranging accuracy is low or high. Similarly, if LBT success probability is determined, the responder UEs 504 may send a message to the initiator UEX 502 only if low probability LBT success is determined (or equivalently if high probability LBT success is determined), or each responder UE 504 may provide an indication to the initiator UEX 502 indicating whether the probability LBT success is low or high.

At stage 540, for example, the responder UEs 504 may provide an indication of the accuracy of the ranging (and optionally of the LBT success probability, if determined), in a message that is separate from the ranging sessions. For example, the indication of the accuracy of the ranging and/or LBT success probability, if determined, may be sent in an ITS message or other direct message to the initiator UEX 502. In some implementations, the indication of the accuracy of the ranging and/or LBT success probability may be determined metrics, such as the variance of the ranges or the number (or average number) of the successful LBT procedures, and the initiator UEX 502, upon receipt may apply the appropriate thresholds to flag low accuracy ranging or UEs with low probability of LBT success. If a separate message, such as illustrated in stage 540 is used, the message may be sent with a periodicity that is greater than the periodicity of the ranging sessions to reduce overhead.

At stage 545, in another example, the responder UEs 504 may provide an indication of the accuracy of the ranging (and optionally of the LBT success probability, if determined), in a post-PRS message in a ranging session, that uses the first PRS bandwidth (BW1). In some implementations, the indication of the accuracy of the ranging and/or LBT success probability may be determined metrics, such as the variance of the ranges or the number (or average number) of the successful LBT procedures, and the initiator UEX 502, upon receipt may apply the appropriate thresholds to flag low accuracy ranging or UEs with low probability of LBT success. If the post-PRS message, such as illustrated in stage 545 is used, the indication of the accuracy of the ranging and/or LBT success probability may be sent the same periodicity as the ranging sessions, i.e., the indication of the accuracy of the ranging and/or LBT success probability over the previous K ranging sessions may be reported in each ranging session.

At stage 550, the initiator UEX 502 determines whether to adjust the bandwidth of the PRS used in subsequent ranging sessions between UEs 502 and 504 based on the ranging accuracy (and optionally the LBT success probabilities) determined in stage 530X and received in stages 540 or 545, as discussed in FIGS. 4A and 4B. For example, as discussed in FIG. 4A, if a number (e.g., an average) of low accuracy indications is greater than the increase threshold β, the initiator UEX 502 may determine to increase the frequency range of the PRS signals in subsequent ranging sessions. The increase threshold β may be based on the accuracy requirement of the ranging application for the initiator UEX 502. Additionally, or alternatively, as discussed in FIG. 4B, the bandwidth of the PRS used in subsequent ranging sessions may be decreased if the probability of LBT success is low for the initiator UEX 502, the responder UEs 504, or a combination thereof. For example, if the probability of LBT success for the initiator UEX 502 is low (e.g., a number (e.g., an average) of successful LBT procedures over the K ranging sessions is less than the success threshold γ), as determined in stage 530X, the initiator UEX 502 may determine to decrease the bandwidth of the PRS used in subsequent ranging sessions. Further, if the number (e.g., an average) of responder UEs 504 having a low probability of successful LBT procedures (e.g., as received in stages 540 or 545), is greater than a UE threshold δ, the initiator UEX 502 may determine to decrease the bandwidth of the PRS used in subsequent ranging sessions. Similarly, if the number (e.g., an average) of the combined initiator UEX 502 and responder UEs 504 having a low probability of successful LBT procedures (e.g., as received in stages 540 or 545), is greater than a UE threshold δ, the initiator UEX 502 may determine to decrease the bandwidth of the PRS used in subsequent ranging sessions. The determination to decrease the bandwidth of the PRS used in subsequent ranging sessions due to low probability of LBT success may offset a determination to increase the bandwidth of the PRS used in subsequent ranging sessions due to low accuracy ranging.

At stage 560, the new ranging session is performed between the UEs 502 and 504 using a second PRS bandwidth (BW2), which may be different than the first RPS bandwidth BW1, and may be adjusted by the initiator UEX 502 based on the determination of stage 550. For example, the initiator UEX 502 may determine to increase the bandwidth for PRS (based on low accuracy ranging without an offsetting decrease in bandwidth due to low probability of LBT success) and may send a pre-PRS message to the responder UEs 504 that identifies the increased second PRS bandwidth (BW2) to be used in the new ranging session. In another example, the initiator UEX 502 may determine to decrease the bandwidth for PRS (based low probability of LBT success without an offsetting increase in bandwidth due to low accuracy ranging) and may send a pre-PRS message to the responder UEs 504 that identifies the decreased second PRS bandwidth (BW2) to be used in the new ranging session. The UEs perform ranging using PRS with the second PRS bandwidth. Each of the UEs 502 and 504 may determine the range between transmitting UEs, e.g., e.g., the initiator UEX 502 determines the range to each responder UE 504, each responder UE 504 determines a range to the initiator UEX 502 and in some implementations determines a range to each other responder UE 504. Additionally, in some implementations, known positions of anchor UEs may be provided, e.g., in post-PRS messages, and the position of the initiator UEX 502 (and any responder UE 504 with an unknown position) may be determined, e.g., using multilateration, as well as any additional information, such as AoA or AoD of the PRS signals or positions and ranges, or geographic information, such as street locations, etc.

The initiator UEX 502 and responder UEs 504 may continually or periodically perform stages 530X, 530A, 530B, 530C, 540 or 545 and 550 for the previous K ranging sessions, e.g., with the responder UEs 504 providing indications of the accuracy and optionally LBT success periodically in separate messages (as in stage 540) or in each post-PRS message (as in stage 545).

Figure 6:
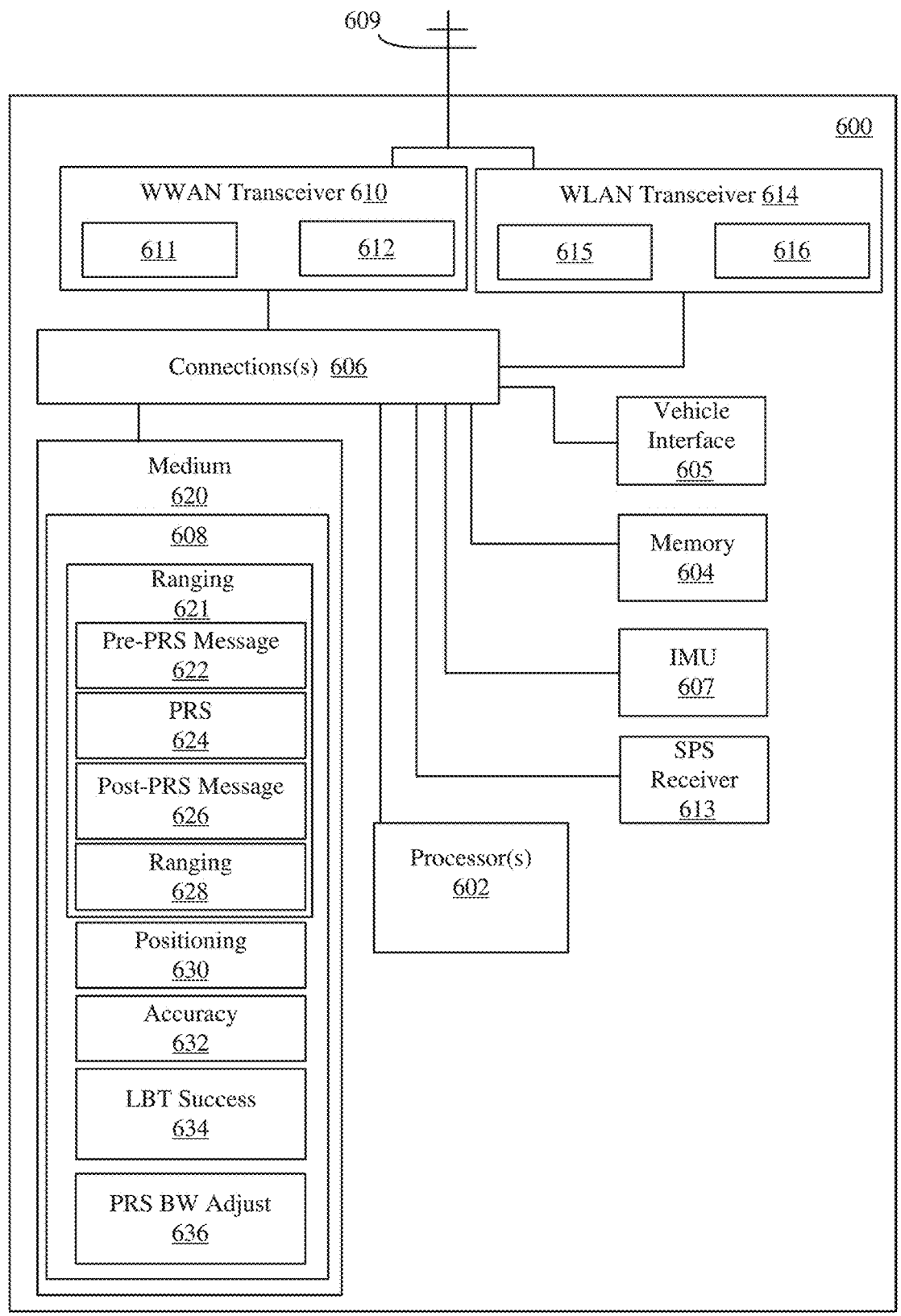
FIG. 6 shows a schematic block diagram illustrating certain exemplary features of a UE configured to support dynamic adjustment of the bandwidth of the PRS during ranging sessions.

FIG. 6 shows a schematic block diagram illustrating certain exemplary features of a user equipment (UE) 600, which may be UE in vehicles 102 or 104, an RSU 110, or UE 112 held by a pedestrian 114, as illustrated in FIG. 1. The UE 600 may be configured to act as an initiator UE, e.g., UEX, or a responder UE, e.g., UEA, in which the bandwidth of the PRS may be dynamically adjusted during ranging sessions, as discussed herein. If the UE 600 is a V-UE, it may be configured to control the automated driving of a vehicle, e.g., vehicle 102. For example, the UE 600 may include a vehicle interface 605 with which commands are provided to the vehicle for automated driving and sensory input, including speed and acceleration, may be provided from the vehicle to UE 600. The UE 600 may, for example, include one or more processors 602, memory 604, an inertial measurement unit (IMU) 607 that may include, e.g., an accelerometer, gyroscope, magnetometers, etc., which may be used to detect orientation with respect to a global or local reference frame and the motion or one or more motion characteristics of the vehicle, a satellite positioning system (SPS) receiver 613 to determine, e.g., a GPS position, and an external interface including, e.g., a Wireless Wide Area Network (WWAN) transceiver 610, and a Wireless Local Area Network (WLAN) transceiver 614, which may be operatively coupled with one or more connections 606 (e.g., buses, lines, fibers, links, etc.) to non-transitory computer readable medium 620 and memory 604. The UE 600 may further include additional items, which are not shown, such as a user interface that may include e.g., a display, a keypad or other input device, such as virtual keypad on the display, through which a user may interface with the user device. In certain example implementations, all or part of UE 600 may take the form of a chipset, and/or the like.

Transceiver 610 may be, e.g., a cellular transceiver, that is configured to transmit and receive direct communications in the wireless network, as illustrated in FIG. 1. The transceiver 610 may include a transmitter 611 enabled to transmit one or more signals over one or more types of wireless communication networks and a receiver 612 to receive one or more signals transmitted over the one or more types of wireless communication networks. Transceiver 614 may be, e.g., a short-range transceiver, and may be configured to transmit and receive direct communications in the wireless network, as illustrated in FIG. 1. The transceiver 614 may include a transmitter 615 enabled to transmit one or more signals, including ranging signals (PRS signals) and pre-ranging (pre-PRS) and post-ranging (post-PRS) messages, and combine and separate messages, over one or more types of wireless communication networks and a receiver 616 to receive one or more signals, e.g., including PRS and pre-PRS and post-PRS messages, combine and separate messages, transmitted over the one or more types of wireless communication networks. The transceivers 610 and 614 enable the UE 600 to communicate with transportation entities using D2D communication links, such as DSRC, C-V2X, or 5G NR.

In some embodiments, UE 600 may include antenna 609, which may be internal or external. The antenna 609 may be used to transmit and/or receive signals processed by transceiver 610 and/or transceiver 614. In some embodiments, antenna 609 may be coupled to transceiver 610 and/or transceiver 614. In some embodiments, measurements of signals received (transmitted) by UE 600 may be performed at the point of connection of the antenna 609 and transceiver 610 and/or transceiver 614. For example, the measurement point of reference for received (transmitted) RF signal measurements may be an input (output) terminal of the receivers 612, 616 (transmitters 611, 615) and an output (input) terminal of the antenna 609. In a UE 600 with multiple antennas 609 or antenna arrays, the antenna connector may be viewed as a virtual point representing the aggregate output (input) of multiple antennas. The phase difference of received signals at multiple antennas or antenna array may be used to determine the AoA of the signal with respect to the antenna array, which may be converted to a local or global reference frame based on a known orientation of the UE 600, e.g., based on the orientation of the UE 600 to the global or local reference frame as measured by the IMU 607.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of UE 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in UE 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in UE 600 is merely exemplary, and as such the functionality of the modules and/or data structures may be combined, separated, and/or be structured in different ways depending upon the implementation of the UE 600.

The medium 620 and/or memory 604 may include a ranging module 621 that when implemented by the one or more processors 602 configures the one or more processors 602 to participate in a ranging session as an initiator UE or a responder UE as discussed herein. The ranging module 621, for example, may include a pre-ranging module (pre-PRS message module 622), a ranging signal module (PRS module 624), a post-ranging module (post-PRS message module 626), and a ranging module 628.

The medium 620 and/or memory 604 may include a pre-PRS message module 622 that when implemented by the one or more processors 602 configures the one or more processors 602 to generate and transmit or receive pre-ranging messages, such as pre-PRS messages, via the transceiver 614, e.g., to initiate a ranging session or to accept a ranging session. The pre-PRS messages may be broadcast, multicast, or unicast (with RRC connection). In some implementations, the PRS messages may be transmitted and received over a licensed spectrum. The pre-PRS message may be an initiating pre-PRS message to initiate a ranging session or a responding pre-PRS message to acknowledge an initiating pre-PRS message. The initiating pre-PRS message (e.g., the pre-PRS request message from the initiator UE includes identifiers for the initiator UE and one or more responder UEs for the ranging session, and indicate the ranging signal resources for participating UEs, including a time and bandwidth of the broadcast ranging (PRS) signals in the ranging session. The participating UEs may be determined, e.g., from capabilities messages received by the UE 600. The pre-PRS request message may further include PRS ID, session ID, etc. The pre-PRS request message may further provide an indication of the speed of the initiator UE or other indication for determining the number (K) of ranging sessions during which accuracy of the ranging (and optionally LBT success) is to be determined, as well as an accuracy threshold $\alpha$.

The medium 620 and/or memory 604 may include a PRS module 624 that when implemented by the one or more processors 602 configures the one or more processors 602 to broadcast and receive a ranging signal to and from other UEs in the ranging session, via the transceiver 614, using the PRS resources indicated in the pre-PRS request message from the initiator UE, as discussed herein. The ranging signal, for example, may be a PRS signal, such as a Quadrature Phase Shift Keying (QPSK) modulated pseudo-noise (PN) sequence as discussed herein. The ranging signal may be broadcast at the assigned bandwidth, at the assigned time and with the PRS identifier assigned in the pre-PRS request message. The ranging signal may be broadcast and received over a licensed spectrum or an unlicensed spectrum pursuant to category 2 or category 4 LBT constraints. Success of failure of the LBT procedure over multiple ranging sessions may be monitored and stored. The one or more processors 602, for example, may be configured to measure the ToD of broadcast ranging signals and the ToA of received ranging signals, and may be configured to measure the AoD of broadcast ranging signals and the AoA of received ranging signals.

The medium 620 and/or memory 604 may include a post-PRS message module 626 that when implemented by the one or more processors 602 configures the one or more processors 602 to send and receive post-ranging messages to and from other UEs in the ranging session, via the transceiver 614, as discussed herein. The post-PRS messages that may include, e.g., an indication of the ToD, and in some implementations the AoD, of the broadcast ranging signals and an indication of the ToA, and in some implementations the AoA, of the received ranging signals. In some implementation, the indication of the ToD and ToA may be a difference between the ToD and ToA. In some implementations, the post-PRS messages may include an indication of the position of the UE, e.g., if the UE is an anchor UE used for positioning another UE. In some implementations, the post PRS message sent to an initiator UE may include an indication of accuracy of the ranging over a number (K) of ranging sessions and/or, an indication of the probability of LBT success over the number (K) of ranging sessions.

The medium 620 and/or memory 604 may include a ranging module 628 that when implemented by the one or more processors 602 configures the one or more processors 602 to determine a range to other UEs based on the ToD and ToA of broadcast and received ranging signals as measured by the UE 600 and received in the post-PRS messages from other UEs.

The medium 620 and/or memory 604 may include a position module 630 that when implemented by the one or more processors 602 configures the one or more processors 602 to determine a position for the UE 600, e.g., based on one or more ranges to broadcasting UEs and their location information using multilateration or other appropriate techniques discussed herein. For example, the one or more processors 602 may implement a Kalman filter or Extended Kalman filter to determine the position of the UE 600.

The medium 620 and/or memory 604 may include an accuracy module 632 that when implemented by the one or more processors 602 configures the one or more processors 602 to determine an indication of the accuracy of the ranging performed by the UE 600 over a number (K) of ranging sessions. The accuracy of the ranging may be determined based on variances (or other statistical metric, such as standard deviation) in the determined ranges to other UEs, e.g., to each responder UE if the UE 600 is the initiator UE or to the initiator UE (and optionally other responder UEs) if the UE 600 is a responder UE, over the number (K) of ranging sessions. The variance in the ranges over the number (K) of ranging sessions to each responder UE may be compared to an accuracy threshold α to determine whether the respective variance should be flagged as indicating low accuracy ranges. The one or more processors 602 may be configured to determine the value of K and the accuracy threshold α based on the speed of the initiator UE. The one or more processors 602 may be configured to send to an initiator UE or receive from responder UEs, via the transceiver 614, the indication of the accuracy of the ranging over the previous K ranging sessions, e.g., in each post-PRS message. In another implementation, the one or more processors 602 may be configured to send to an initiator UE or receive from responder UEs, via the transceiver 614, a message that is separate from the ranging sessions, e.g., in an ITS message or other direct message to the initiator UE, and that includes the indication of the accuracy of the ranging over the previous K ranging sessions.

The medium 620 and/or memory 604 may include an LBT success module 634 that when implemented by the one or more processors 602 configures the one or more processors 602 to determine an indication of the probability of LBT success in the PRS transmissions over the previous K ranging sessions if the PRS is broadcast over an unlicensed spectrum and an LBT procedure is used. The indication of LBT success may be determined based on the number (e.g., an average) of the successful LBT procedures over the previous K ranging sessions. The average number of successful LBT procedures may be compared to the success threshold γ to determine whether UE should be flagged as having a low probability of LBT success, e.g., if the average number of LBT successes is less than the success threshold γ. The one or more processors 602 may be configured to determine the value of K based on the speed of the initiator UE and the success threshold γ based on the number of participating UEs or responder UEs in the ranging session. The one or more processors 602 may be configured to send to an initiator UE or receive from responder UEs, via the transceiver 614, the indication of the probability of LBT success over the previous K ranging sessions, e.g., in each post-PRS message. In another implementation, the one or more processors 602 may be configured to send to an initiator UE or receive from responder UEs, via the transceiver 614, a message that is separate from the ranging sessions, e.g., in an ITS message or other direct message to the initiator UE, and that includes the indication of the probability of LBT success over the previous K ranging sessions. The probability of LBT success may be sent to the initiator UE in the same message as the indication of the accuracy of the ranging.

The medium 620 and/or memory 604 may include a PRS BW adjustment module 636 that when implemented by the one or more processors 602 configures the one or more processors 602 to determine whether the PRS bandwidth in subsequent ranging sessions may be increased, e.g., due to low accuracy in ranging, or decreased, e.g., due to low probability of LBT success, or a combination thereof, e.g., if the UE 600 is an initiator UE. The one or more processors 602 may be configured to determine if a number (e.g., an average number) of indications of low accuracy ranging from the participating UEs is greater than the increase threshold β, and if so, frequency range used for PRS signals in subsequent ranging sessions is incrementally increased. The one or more processors 602 may be configured to determine the increase threshold β based on the accuracy requirement of the ranging application for the initiator UEX 502. Additionally, or alternatively, the one or more processors 602 may be configured to determine if the probability of LBT success for the initiator UE, the responder UEs, or a combination thereof is low, and if so, the frequency range used for PRS signals in subsequent ranging sessions is incrementally decreased. For example, the one or more processors 602 may be configured to determine if the probability of LBT success for the initiator UE is low based on the number (e.g., average) of successful LBT procedures performed by the initiator UE over the K ranging sessions is less than the success threshold γ. In another example, the one or more processors 602 may be configured to determine if the probability of LBT success for the responder UEs is low based on whether the number (e.g., an average) of responder UEs that indicate a low probability LBT success is greater than a UE threshold δ. In another example, the one or more processors 602 may be configured to determine if the probability of LBT success for all participating UEs (including the initiator UE and the responder UEs) is low based whether the number (e.g., an average) of all UEs that indicate a low probability LBT success is greater than a UE threshold δ. The one or more processors 602 may be configured to determine the UE threshold δ based on the number of responder UEs or participating UEs in the ranging session. The one or more processors 602 may be configured to cause the PRS bandwidth in subsequent ranging sessions to be adjusted based on a determination that the PRS bandwidth in subsequent ranging sessions should be adjusted.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program code 608. For example, the non-transitory computer readable medium including program code 608 stored thereon may include program code 608 to support adjustment of the bandwidth of the PRS signals during ranging sessions, in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include a transceiver 610 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random-access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable program code 608 stored thereon, which if executed by one or more processors 602 may be operatively enabled to perform all or portions of the example operations as described herein. Computer readable medium 620 may be a part of memory 604.

Figure 7:
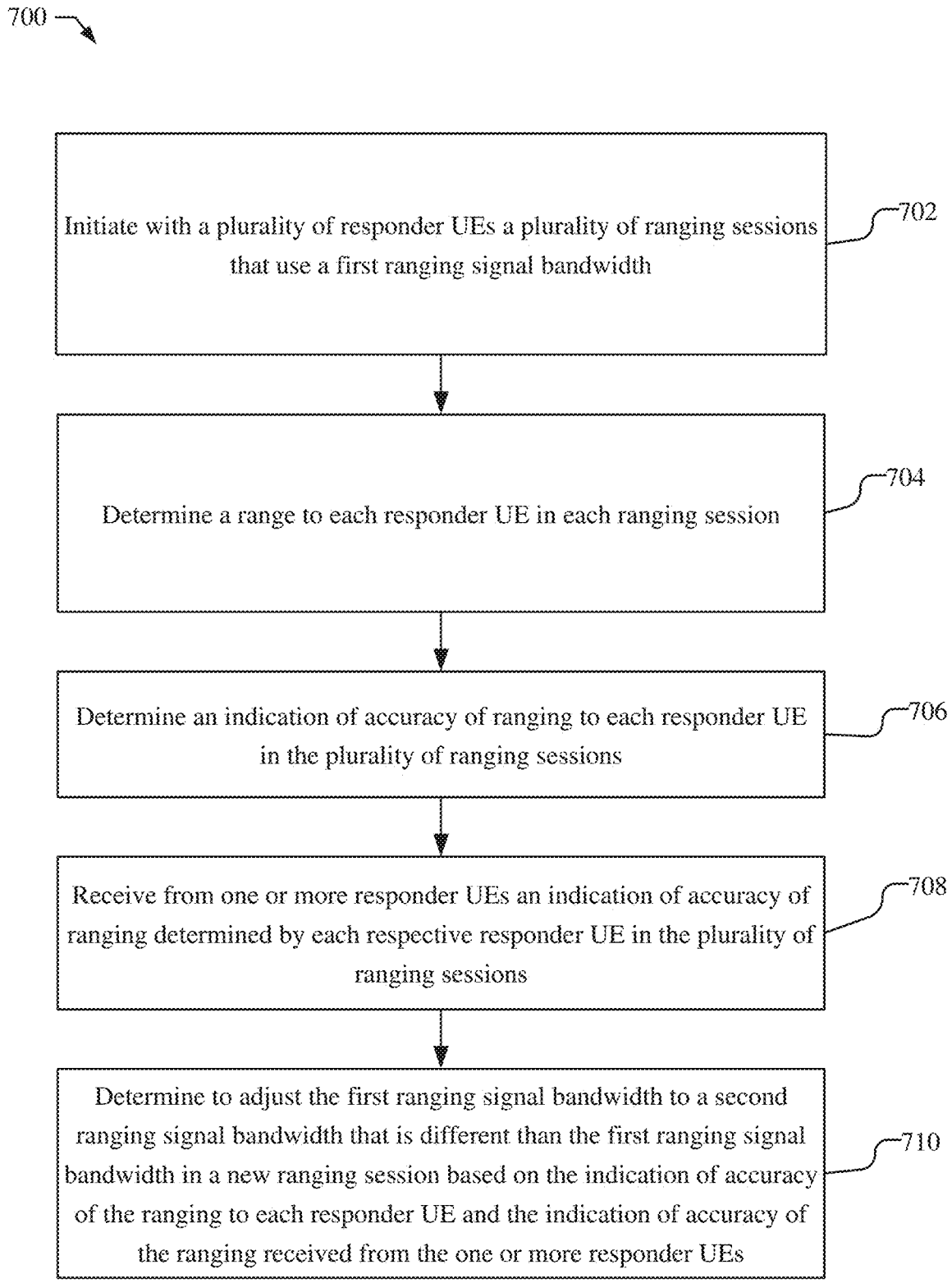
FIG. 7 is a flow chart illustrating a method of ranging between UEs implemented by an initiator UE.

FIG. 7 is a flow chart 700 illustrating a method of ranging performed by an initiator UE in a distributed system of UEs. The initiator UE, for example, may be the UEX in FIGS. 2, 3, 4A, 4B, 5, or UE 600 in FIG. 6.

At block 702, the initiator UE may initiate with a plurality of responder UEs a plurality of ranging sessions that use a first ranging signal bandwidth, e.g., as discussed in FIGS. 2 and 3 and stages 510 and 520 of FIG. 5. A means for initiating with a plurality of responder UEs a plurality of ranging sessions that use a first ranging signal bandwidth may be, e.g., the transceiver 614 and the one or more processors 602 with dedicated hardware or implementing executable code or software instructions in memory 604 and/or medium 620, such as the ranging module 621 and the pre-PRS message module 622.

At block 704, the initiator UE determines a range to each responder UE in each ranging session, e.g., as discussed in FIGS. 2 and 3 and stages 510 and 520 of FIG. 5. A means for determining a range to each responder UE in each ranging session may be, e.g., the transceiver 614 and the one or more processors 602 with dedicated hardware or implementing executable code or software instructions in memory 604 and/or medium 620, such as the ranging module 621 and the ranging module 628.

At block 706, the initiator UE determines an indication of accuracy of ranging to each responder UE in the plurality of ranging sessions, e.g., as discussed in FIG. 4A and stage 530X of FIG. 5. A means for determining an indication of accuracy of ranging to each responder UE in the plurality of ranging sessions may be, e.g., the one or more processors 602 with dedicated hardware or implementing executable code or software instructions in memory 604 and/or medium 620, such as the accuracy module 632.

At block 708, the initiator UE receives from one or more responder UEs an indication of accuracy of ranging determined by each respective responder UE in the plurality of ranging sessions, e.g., as discussed in FIG. 4A and stages 540 and 545 of FIG. 5. For example, the indication of accuracy of the ranging received from each of the one or more responder UEs may be received in a message that is separate from the ranging sessions, such as illustrated in stage 540 of FIG. 5. In another example, the indication of accuracy of the ranging received from each of the one or more responder UEs may be received in post-ranging messages in each ranging session, such as illustrated in stage 545 of FIG. 5. A means for receiving from one or more responder UEs an indication of accuracy of ranging determined by each respective responder UE in the plurality of ranging sessions may be, e.g., the transceiver 614 and the one or more processors 602 with dedicated hardware or implementing executable code or software instructions in memory 604 and/or medium 620, such as the ranging module 621, the post-PRS message module 626, and the accuracy module 632.

At block 710, the initiator UE determines to adjust the first ranging signal bandwidth to a second ranging signal bandwidth that is different than the first ranging signal bandwidth in a new ranging session based on the indication of accuracy of the ranging to each responder UE and the indication of accuracy of the ranging received from the one or more responder UEs, e.g., as discussed in FIG. 4A and stage 550 of FIG. 5. A means for determining to adjust the first ranging signal bandwidth to a second ranging signal bandwidth that is different than the first ranging signal bandwidth in a new ranging session based on the indication of accuracy of the ranging to each responder UE and the indication of accuracy of the ranging received from the one or more responder UEs may be, e.g., the one or more processors 602 with dedicated hardware or implementing executable code or software instructions in memory 604 and/or medium 620, such as the PRS BW adjust module 636.

In one implementation, the indication of the accuracy of the ranging to each responder UE may be determined over a predetermined number of ranging sessions, wherein the predetermined number of ranging sessions is based on a speed of the initiator UE, e.g., as discussed in FIG. 4A and stage 530X of FIG. 5. The initiator UE may determine the indication of the accuracy of the ranging to each responder UE in the plurality of ranging sessions by determining a variance in the determined ranges to each responder UE over the predetermined number of ranging sessions; and comparing the variance in the determined ranges to each responder UE to a predetermined threshold, e.g., as discussed in FIG. 4A and stage 530X of FIG. 5. The indication of the accuracy of the ranging to each responder UE in the plurality of ranging sessions may be based on the comparison of the variance in the determined ranges to each responder UE to the predetermined threshold, e.g., as discussed in FIG. 4A and stage 530X of FIG. 5. The predetermined threshold, for example, may be based on the speed of the initiator UE. A means for determining a variance in the determined ranges to each responder UE over the predetermined number of ranging sessions may be, e.g., the one or more processors 602 with dedicated hardware or implementing executable code or software instructions in memory 604 and/or medium 620, such as the accuracy module 632. A means for comparing the variance in the determined ranges to each responder UE to a predetermined threshold may be, e.g., the one or more processors 602 with dedicated hardware or implementing executable code or software instructions in memory 604 and/or medium 620, such as the accuracy module 632.

In one implementation, the initiator UE may determine to adjust the first ranging signal bandwidth to the second ranging signal bandwidth by determining a number of indications of accuracy of ranging based on the indication of accuracy of the ranging to each responder UE and the indication of accuracy of the ranging received from the one or more responder UEs, e.g., as discussed in FIG. 4A and stage 550 of FIG. 5. The initiator UE may compare the number of indications of accuracy of the ranging to a predetermined threshold, e.g., as discussed in FIG. 4A and stage 550 of FIG. 5. The initiator UE may determine to increase the first ranging signal bandwidth to the second ranging signal bandwidth based on the comparison of the number of indications of accuracy ranging to the predetermined threshold, e.g., as discussed in FIG. 4A and stage 550 of FIG. 5. A means for determining a number of indications of accuracy of ranging based on the indication of accuracy of the ranging to each responder UE and the indication of accuracy of the ranging received from the one or more responder UEs may be, e.g., the one or more processors 602 with dedicated hardware or implementing executable code or software instructions in memory 604 and/or medium 620, such as the accuracy module 632 and the PRS BW adjust module 636. A means for comparing the number of indications of accuracy of the ranging to a predetermined threshold may be, e.g., the one or more processors 602 with dedicated hardware or implementing executable code or software instructions in memory 604 and/or medium 620, such as the PRS BW adjust module 636. A means for determining to increase the first ranging signal bandwidth to the second ranging signal bandwidth based on the comparison of the number of indications of accuracy ranging to the predetermined threshold may be, e.g., the one or more processors 602 with dedicated hardware or implementing executable code or software instructions in memory 604 and/or medium 620, such as the PRS BW adjust module 636.

For example, the initiator UE may determine the number of indications of accuracy of the ranging by determining an average of the number of indications of accuracy of the ranging for all UEs participating in the plurality of ranging sessions, wherein the average of the number of indications of accuracy of ranging is compared to the predetermined threshold, e.g., as discussed in FIG. 4A and stage 550 of FIG. 5. The initiator UE may further initiate with the plurality of responder UEs the new ranging session that uses the second ranging signal bandwidth in response to the comparison of the average of the number of indications of accuracy of the ranging to the predetermined threshold, e.g., as discussed in FIG. 4A and stages 550 and 560 of FIG. 5. The predetermined threshold, for example, may be based on an accuracy requirement for the ranging sessions. A means for determining an average of the number of indications of accuracy of the ranging for all UEs participating in the plurality of ranging sessions, wherein the average of the number of indications of accuracy of ranging is compared to the predetermined threshold may be, e.g., the one or more processors 602 with dedicated hardware or implementing executable code or software instructions in memory 604 and/or medium 620, such as the PRS BW adjust module 636. A means for initiating with the plurality of responder UEs the new ranging session that uses the second ranging signal bandwidth in response to the comparison of the average of the number of indications of accuracy of the ranging to the predetermined threshold may be, e.g., the transceiver 614 and the one or more processors 602 with dedicated hardware or implementing executable code or software instructions in memory 604 and/or medium 620, such as the ranging module 621, the pre-PRS message module 622, and PRS BW adjust module 636.

In one implementation, the ranging signals in the plurality of ranging sessions may be broadcast over an unlicensed spectrum using listen before transmit (LBT) procedures. The initiator UE may determine to adjust the first ranging signal bandwidth to the second ranging signal bandwidth further based on at least one of a probability of successful LBT procedures determined by the initiator UE in the plurality of ranging sessions, indications received from the one or more responder UEs of a probability of successful LBT procedures performed by each respective responder UE in the plurality of ranging sessions, or a combination thereof, e.g., as discussed in FIG. 4B and stage 550 of FIG. 5.

For example, in one implementation, the initiator UE may record a number of successful LBT procedures performed by the initiator UE in a number of ranging sessions, e.g., as discussed in FIG. 4B and stage 530X of FIG. 5. A means for recording a number of successful LBT procedures performed by the initiator UE in a number of ranging sessions may be, e.g., the transceiver 614 and the one or more processors 602 with dedicated hardware or implementing executable code or software instructions in memory 604 and/or medium 620, such as the ranging module 621, the PRS module 624, and the LBT success module 634. The initiator UE may determine an average number of successful LBT procedures based on the number of successful LBT procedures performed by the initiator UE and a number of LBT procedures performed by the initiator UE in the number of ranging sessions, e.g., as discussed in FIG. 4B and stage 530X of FIG. 5. A means for determining an average number of successful LBT procedures based on the number of successful LBT procedures performed by the initiator UE and a number of LBT procedures performed by the initiator UE in the number of ranging sessions may be, e.g., the one or more processors 602 with dedicated hardware or implementing executable code or software instructions in memory 604 and/or medium 620, such as the LBT success module 634. The initiator UE may compare the average number of successful LBT procedures to a predetermined threshold, e.g., as discussed in FIG. 4B and stage 550 of FIG. 5. A means for comparing the average number of successful LBT procedures to a predetermined threshold may be, e.g., the one or more processors 602 with dedicated hardware or implementing executable code or software instructions in memory 604 and/or medium 620, such as the LBT success module 634. The initiator UE may determine to decrease the first ranging signal bandwidth in the new ranging session based on the comparison of the average number of successful LBT procedures to the predetermined threshold, e.g., as discussed in FIG. 4B and stage 550 of FIG. A means for determining to decrease the first ranging signal bandwidth in the new ranging session based on the comparison of the average number of successful LBT procedures to the predetermined threshold may be, e.g., the one or more processors 602 with dedicated hardware or implementing executable code or software instructions in memory 604 and/or medium 620, such as the PRS BW adjust module 636. For example, the number of ranging sessions in the plurality of ranging sessions may be a predetermined number based on a speed of the initiator UE, and the predetermined threshold may be based on a number of responder UEs, e.g., as discussed in FIG. 4B and stages 530X and 550 of FIG. 5.

In another example, in one implementation, the initiator UE may receive from the one or more responder UEs the indications of the probability of successful LBT procedures performed by each respective responder UE in a number of ranging sessions in the plurality of ranging sessions, e.g., as discussed in FIG. 4B and stages 540 and 545 of FIG. 5. A means for receiving from the one or more responder UEs the indications of the probability of successful LBT procedures performed by each respective responder UE in a number of ranging sessions in the plurality of ranging sessions may be, e.g., the transceiver 614 and the one or more processors 602 with dedicated hardware or implementing executable code or software instructions in memory 604 and/or medium 620, such as the ranging module 621, the post-PRS message module 626, and the LBT success module 634. The initiator UE may determine a number of UEs with the probability of successful LBT procedures based on at least the indications of the probability of successful LBT procedures performed by each respective responder UE in the number of ranging sessions in the plurality of ranging sessions, e.g., as discussed in FIG. 4B and stage 550 of FIG. 5. A means for determining a number of UEs with the probability of successful LBT procedures based on at least the indications of the probability of successful LBT procedures performed by each respective responder UE in the number of ranging sessions in the plurality of ranging sessions may be, e.g., the one or more processors 602 with dedicated hardware or implementing executable code or software instructions in memory 604 and/or medium 620, such as the LBT success module 634. The initiator UE may compare the number of UEs with the probability of successful LBT procedures to a predetermined threshold, e.g., as discussed in FIG. 4B and stage 550 of FIG. 5. A means for comparing the number of UEs with the probability of successful LBT procedures to a predetermined threshold may be, e.g., the one or more processors 602 with dedicated hardware or implementing executable code or software instructions in memory 604 and/or medium 620, such as the LBT success module 634. The initiator UE may determine to decrease the first ranging signal bandwidth in the new ranging session based on the comparison of the number of UEs with the probability of successful LBT procedures to the predetermined threshold, e.g., as discussed in FIG. 4B and stage 550 of FIG. 5. A means for determining to decrease the first ranging signal bandwidth in the new ranging session based on the comparison of the number of UEs with the probability of successful LBT procedures to the predetermined threshold may be, e.g., the one or more processors 602 with dedicated hardware or implementing executable code or software instructions in memory 604 and/or medium 620, such as the PRW BW adjust module 636. For example, the number of UEs with the probability of successful LBT procedures may be further based on the probability of successful LBT procedures determined by the initiator UE, e.g., as discussed in FIG. 4B and at stages 530X and 550 of FIG. 5. The number of ranging session may be a predetermined number based on a speed of the initiator UE, and the predetermined threshold may be based on a number of responder UEs, e.g., as discussed in FIG. 4B and stages 530X and 550 of FIG. 5.

In one implementation, the initiator UE may adjust the first ranging signal bandwidth to the second ranging signal bandwidth in the new ranging session in response to a determination to adjust the first ranging signal bandwidth to the second ranging signal bandwidth, e.g., as discussed in FIG. 4A and stage 560 of FIG. 5. A means for adjusting the first ranging signal bandwidth to the second ranging signal bandwidth in the new ranging session in response to a determination to adjust the first ranging signal bandwidth to the second ranging signal bandwidth may be, e.g., the one or more processors 602 with dedicated hardware or implementing executable code or software instructions in memory 604 and/or medium 620, such as the PRS BW adjust module 636.

Figure 8:
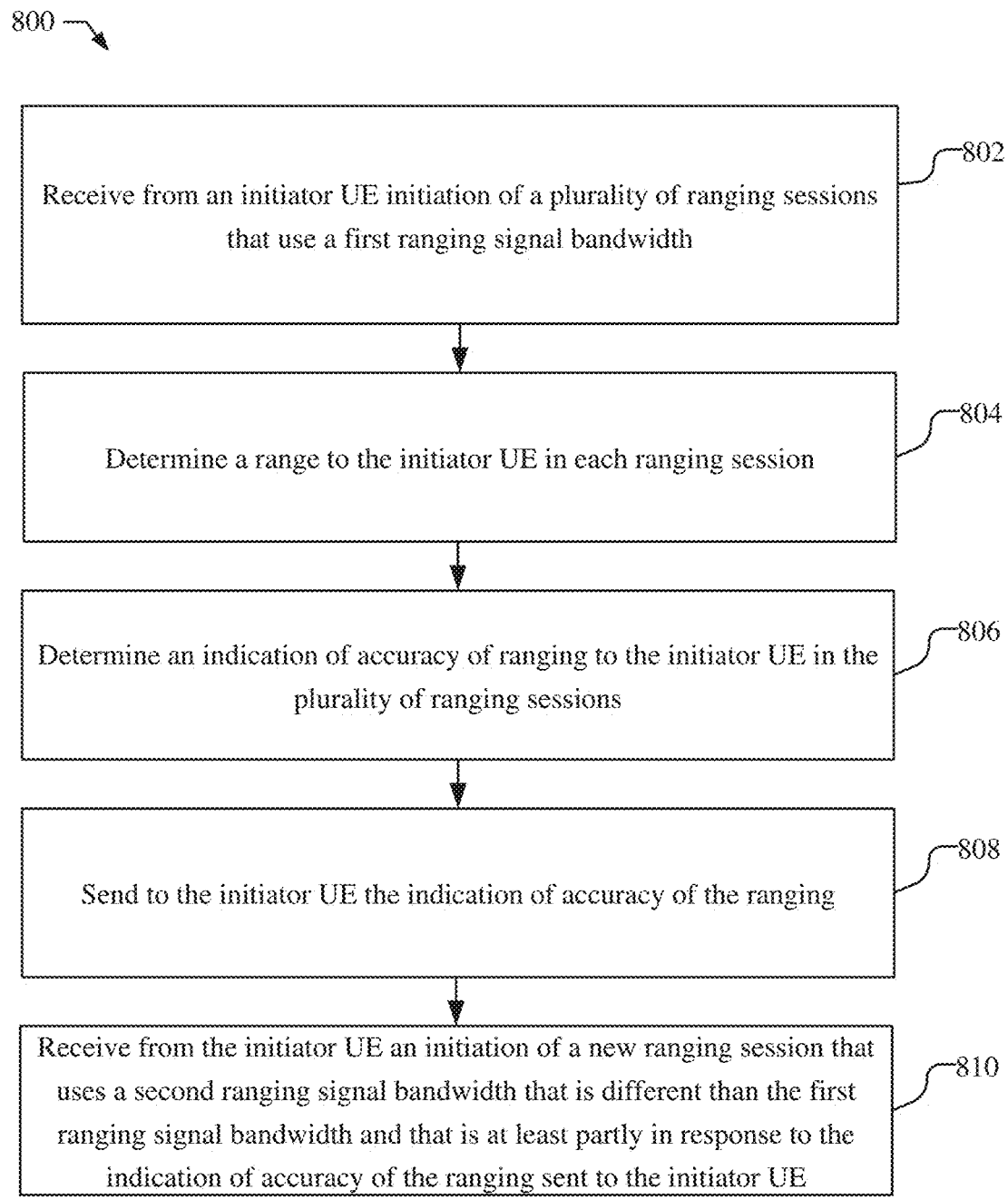
FIG. 8 is a flow chart illustrating a method of ranging between UEs implemented by a responder UE.

FIG. 8 is a flow chart 800 illustrating a method of ranging performed by a responder UE in a distributed system of UEs. The responder UE, for example, may be the UEA in FIGS. 2, 3, 4A, 4B, 5, or UE 600 in FIG. 6.

At block 802, the responder UE may receive from an initiator UE initiation of a plurality of ranging sessions that use a first ranging signal bandwidth, e.g., as discussed in FIGS. 2 and 3 and stages 510 and 520 of FIG. 5. A means for receiving from an initiator UE initiation of a plurality of ranging sessions that use a first ranging signal bandwidth may be, e.g., the transceiver 614 and the one or more processors 602 with dedicated hardware or implementing executable code or software instructions in memory 604 and/or medium 620, such as the ranging module 621 and the pre-PRS message module 622.

At block 804, the responder UE may determine a range to the initiator UE in each ranging session, e.g., as discussed in FIGS. 2 and 3 and stages 510 and 520 of FIG. 5. A means for determining a range to the initiator UE in each ranging session may be, e.g., the transceiver 614 and the one or more processors 602 with dedicated hardware or implementing executable code or software instructions in memory 604 and/or medium 620, such as the ranging module 621 and the ranging module 628.

At block 806, the responder UE determines an indication of accuracy of ranging to the initiator UE in the plurality of ranging sessions, e.g., as discussed in FIG. 4A and stage 530A of FIG. 5. A means for determining an indication of accuracy of ranging to the initiator UE in the plurality of ranging sessions may be, e.g., the one or more processors 602 with dedicated hardware or implementing executable code or software instructions in memory 604 and/or medium 620, such as the accuracy module 632.

At block 808, the responder UE sends to the initiator UE the indication of accuracy of the ranging, e.g., as discussed in FIG. 4A and stages 540 and 545 of FIG. 5. For example, the indication of accuracy of the ranging may be sent in a message that is separate from the ranging sessions, such as illustrated in stage 540 of FIG. 5. In another example, the indication of accuracy of the ranging may be sent in post-ranging messages in each ranging session, such as illustrated in stage 545 of FIG. 5. A means for sending to the initiator UE the indication of accuracy of the ranging may be, e.g., the transceiver 614 and the one or more processors 602 with dedicated hardware or implementing executable code or software instructions in memory 604 and/or medium 620, such as the ranging module 621, the post-PRS message module 626, and the accuracy module 632.

At block 810, the responder UE receives from the initiator UE an initiation of a new ranging session that uses a second ranging signal bandwidth that is different than the first ranging signal bandwidth and that is at least partly in response to the indication of accuracy of the ranging sent to the initiator UE, e.g., as discussed in FIG. 4A and stage 560 of FIG. 5. A means for receiving from the initiator UE an initiation of a new ranging session that uses a second ranging signal bandwidth that is different than the first ranging signal bandwidth and that is at least partly in response to the indication of accuracy of the ranging sent to the initiator UE may be, e.g., the transceiver 614 and the one or more processors 602 with dedicated hardware or implementing executable code or software instructions in memory 604 and/or medium 620, such as the ranging module 621 and the pre-PRS message module 622.

In one implementation, the indication of the accuracy of the ranging is determined over a predetermined number of ranging sessions, wherein the predetermined number of ranging sessions is based on a speed of the initiator UE, e.g., as discussed in FIG. 4A and stage 530A of FIG. 5. The responder UE may determine the indication of the accuracy of the ranging to the initiator UE in the plurality of ranging sessions by determining a variance in the ranges to the initiator UE over the predetermined number of ranging sessions; and comparing the variance in the ranges to a predetermined threshold, e.g., as discussed in FIG. 4A and stage 530A of FIG. 5. The indication of the accuracy of the ranging may be based on the comparison of the variance in the ranges to the predetermined threshold, e.g., as discussed in FIG. 4A and stage 530A of FIG. 5. The predetermined threshold, for example, may be based on the speed of the initiator UE. A means for determining a variance in the ranges to the initiator UE over the predetermined number of ranging sessions may be, e.g., the one or more processors 602 with dedicated hardware or implementing executable code or software instructions in memory 604 and/or medium 620, such as the accuracy module 632. A means for comparing the variance in the ranges to a predetermined threshold may be, e.g., the one or more processors 602 with dedicated hardware or implementing executable code or software instructions in memory 604 and/or medium 620, such as the accuracy module 632.

In one implementation, the ranging signals in the plurality of ranging sessions may be broadcast over an unlicensed spectrum using listen before transmit (LBT) procedures. The responder UE may determine an indication of a probability of successful LBT procedures performed in the plurality of ranging sessions, e.g., as discussed in FIG. 4B and stage 530A of FIG. 5. A means for determining an indication of a probability of successful LBT procedures performed in the plurality of ranging sessions may be, e.g., the transceiver 614 and the one or more processors 602 with dedicated hardware or implementing executable code or software instructions in memory 604 and/or medium 620, such as the ranging module 621, the PRS module 624, and the LBT success module 634. The responder UE may send the indication of the probability of successful LBT procedures to the initiator UE, e.g., as discussed in FIG. 4B and stages 540 and 545 in FIG. 5. A means for sending the indication of the probability of successful LBT procedures to the initiator UE may be, e.g., the transceiver 614 and the one or more processors 602 with dedicated hardware or implementing executable code or software instructions in memory 604 and/or medium 620, such as the ranging module 621, the post-PRS message module 626, and the LBT success module 634. The initiation of the new ranging session including the second ranging signal bandwidth may be further at least partly in response to the indication of the probability of successful LBT procedures, e.g., as discussed at stages 550 and 560 of FIG. 5.

For example, in one implementation, the responder may record a number of successful LBT procedures performed in a number of ranging sessions, e.g., as discussed in FIG. 4B and stage 530A of FIG. 5. A means for recording a number of successful LBT procedures performed in a number of ranging sessions may be, e.g., the transceiver 614 and the one or more processors 602 with dedicated hardware or implementing executable code or software instructions in memory 604 and/or medium 620, such as the ranging module 621, the PRS module 624, and the LBT success module 634. The responder UE may determine an average number of successful LBT procedures based on the number of successful LBT procedures and a number of LBT procedures performed by the responder UE in the number of ranging sessions, e.g., as discussed in FIG. 4B and stage 530A of FIG. 5. A means for determining an average number of successful LBT procedures based on the number of successful LBT procedures and a number of LBT procedures performed by the responder UE in the number of ranging sessions may be, e.g., the one or more processors 602 with dedicated hardware or implementing executable code or software instructions in memory 604 and/or medium 620, such as the LBT success module 634. The responder UE may compare the average number of successful LBT procedures to a predetermined threshold, e.g., as discussed in FIG. 4B and stage 530A of FIG. 5. A means for comparing the average number of successful LBT procedures to a predetermined threshold may be, e.g., the one or more processors 602 with dedicated hardware or implementing executable code or software instructions in memory 604 and/or medium 620, such as the LBT success module 634. The indication of the probability of successful LBT procedures may be based on the comparison of the average number of successful LBT procedures to the predetermined threshold, e.g., as discussed at FIG. 4B and stage 530A of FIG. 5. The number of ranging sessions, for example, may be a predetermined number based on a speed of the initiator UE, and the predetermined threshold may be based on a number of responder UEs, e.g., e.g., as discussed in FIG. 4B and stage 530A of FIG. 5.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

Clause 1. A method of ranging performed by an initiator user equipment (UE) in a distributed system of UEs, the method comprising: initiating with a plurality of responder UEs a plurality of ranging sessions that use a first ranging signal bandwidth; determining a range to each responder UE in each ranging session; determining an indication of accuracy of ranging to each responder UE in the plurality of ranging sessions; receiving from one or more responder UEs an indication of accuracy of ranging determined by each respective responder UE in the plurality of ranging sessions; determining to adjust the first ranging signal bandwidth to a second ranging signal bandwidth that is different than the first ranging signal bandwidth in a new ranging session based on the indication of accuracy of the ranging to each responder UE and the indication of accuracy of the ranging received from the one or more responder UEs.

Clause 2. The method of clause 1, wherein the indication of accuracy of the ranging received from each of the one or more responder UEs is received in a message that is separate from the ranging sessions.

Clause 3. The method of either of clauses 1 or 2, wherein the indication of accuracy of the ranging received from each of the one or more responder UEs is received in post-ranging messages in each ranging session.

Clause 4. The method of any of clauses 1-3, wherein the indication of the accuracy of the ranging to each responder UE is determined over a predetermined number of ranging sessions, wherein the predetermined number of ranging sessions is based on a speed of the initiator UE.

Clause 5. The method of clause 4, wherein determining the indication of the accuracy of the ranging to each responder UE in the plurality of ranging sessions comprises: determining a variance in the determined ranges to each responder UE over the predetermined number of ranging sessions; and comparing the variance in the determined ranges to each responder UE to a predetermined threshold; wherein the indication of the accuracy of the ranging to each responder UE in the plurality of ranging sessions is based on the comparison of the variance in the determined ranges to each responder UE to the predetermined threshold.

Clause 6. The method of clause 5, wherein the predetermined threshold is based on the speed of the initiator UE.

Clause 7. The method of any of clauses 1-6, wherein determining to adjust the first ranging signal bandwidth to the second ranging signal bandwidth comprises: determining a number of indications of accuracy of ranging based on the indication of accuracy of the ranging to each responder UE and the indication of accuracy of the ranging received from the one or more responder UEs; and comparing the number of indications of accuracy of the ranging to a predetermined threshold; and determining to increase the first ranging signal bandwidth to the second ranging signal bandwidth based on the comparison of the number of indications of accuracy ranging to the predetermined threshold.

Clause 8. The method of clause 7, wherein: determining the number of indications of accuracy of the ranging comprises determining an average of the number of indications of accuracy of the ranging for all UEs participating in the plurality of ranging sessions, wherein the average of the number of indications of accuracy of ranging is compared to the predetermined threshold; and the method further comprises initiating with the plurality of responder UEs the new ranging session that uses the second ranging signal bandwidth in response to the comparison of the average of the number of indications of accuracy of the ranging to the predetermined threshold.

Clause 9. The method of clause 8, wherein the predetermined threshold is based on an accuracy requirement for the ranging sessions.

Clause 10. The method of any of clauses 1-9, wherein ranging signals in the plurality of ranging sessions are broadcast over an unlicensed spectrum using listen before transmit (LBT) procedures, wherein: determining to adjust the first ranging signal bandwidth to the second ranging signal bandwidth is further based on at least one of a probability of successful LBT procedures determined by the initiator UE in the plurality of ranging sessions, indications received from the one or more responder UEs of a probability of successful LBT procedures performed by each respective responder UE in the plurality of ranging sessions, or a combination thereof.

Clause 11. The method of clause 10, further comprising: recording a number of successful LBT procedures performed by the initiator UE in a number of ranging sessions; determining an average number of successful LBT procedures based on the number of successful LBT procedures performed by the initiator UE and a number of LBT procedures performed by the initiator UE in the number of ranging sessions; and comparing the average number of successful LBT procedures to a predetermined threshold; determining to decrease the first ranging signal bandwidth in the new ranging session based on the comparison of the average number of successful LBT procedures to the predetermined threshold.

Clause 12. The method of clause 11, wherein the number of ranging sessions in the plurality of ranging sessions is a predetermined number based on a speed of the initiator UE, and the predetermined threshold is based on a number of responder UEs.

Clause 13. The method of clause 10, further comprising: receiving from the one or more responder UEs the indications of the probability of successful LBT procedures performed by each respective responder UE in a number of ranging sessions in the plurality of ranging sessions; determining a number of UEs with the probability of successful LBT procedures based on at least the indications of the probability of successful LBT procedures performed by each respective responder UE in the number of ranging sessions in the plurality of ranging sessions; comparing the number of UEs with the probability of successful LBT procedures to a predetermined threshold; and determining to decrease the first ranging signal bandwidth in the new ranging session based on the comparison of the number of UEs with the probability of successful LBT procedures to the predetermined threshold.

Clause 14. The method of clause 13, wherein the number of UEs with the probability of successful LBT procedures is further based the probability of successful LBT procedures determined by the initiator UE.

Clause 15. The method of clause 13, wherein the number of ranging session is a predetermined number based on a speed of the initiator UE, and the predetermined threshold is based on a number of responder UEs.

Clause 16. The method of any of clauses 1-15, further comprising adjusting the first ranging signal bandwidth to the second ranging signal bandwidth in the new ranging session in response to a determination to adjust the first ranging signal bandwidth to the second ranging signal bandwidth.

Clause 17. An initiator user equipment (UE) configured for ranging between UEs in a distributed system of UEs, the initiator UE comprising: a wireless transceiver configured to wirelessly communicate with entities in a wireless network; at least one memory; and at least one processor coupled to the wireless transceiver and the at least one memory, wherein the at least one processor is configured to: initiate with a plurality of responder UEs a plurality of ranging sessions that use a first ranging signal bandwidth; determine a range to each responder UE in each ranging session; determine an indication of accuracy of ranging to each responder UE in the plurality of ranging sessions; receive from one or more responder UEs an indication of accuracy of ranging determined by each respective responder UE in the plurality of ranging sessions; determine to adjust the first ranging signal bandwidth to a second ranging signal bandwidth that is different than the first ranging signal bandwidth in a new ranging session based on the indication of accuracy of the ranging to each responder UE and the indication of accuracy of the ranging received from the one or more responder UEs.

Clause 18. The initiator UE of clause 17, wherein the indication of accuracy of the ranging received from each of the one or more responder UEs is received in a message that is separate from the ranging sessions.

Clause 19. The initiator UE of either of clauses 17 or 18, wherein the indication of accuracy of the ranging received from each of the one or more responder UEs is received in post-ranging messages in each ranging session.

Clause 20. The initiator UE of any of clauses 17-19, wherein the indication of the accuracy of the ranging to each responder UE is determined over a predetermined number of ranging sessions, wherein the predetermined number of ranging sessions is based on a speed of the initiator UE.

Clause 21. The initiator UE of clause 20, wherein the at least one processor is configured to determine the indication of the accuracy of the ranging to each responder UE in the plurality of ranging sessions by being configured to: determine a variance in the determined ranges to each responder UE over the predetermined number of ranging sessions; and compare the variance in the determined ranges to each responder UE to a predetermined threshold; wherein the indication of the accuracy of the ranging to each responder UE in the plurality of ranging sessions is based on the comparison of the variance in the determined ranges to each responder UE to the predetermined threshold.

Clause 22. The initiator UE of clause 21, wherein the predetermined threshold is based on the speed of the initiator UE.

Clause 23. The initiator UE of any of clauses 17-22, wherein the at least one processor is configured to determine to adjust the first ranging signal bandwidth to the second ranging signal bandwidth by being configured to: determine a number of indications of accuracy of ranging based on the indication of accuracy of the ranging to each responder UE and the indication of accuracy of the ranging received from the one or more responder UEs; and compare the number of indications of accuracy of the ranging to a predetermined threshold; and determine to increase the first ranging signal bandwidth to the second ranging signal bandwidth based on the comparison of the number of indications of accuracy ranging to the predetermined threshold.

Clause 24. The initiator UE of clause 23, wherein: the at least one processor is configured to determine the number of indications of accuracy of the ranging by being configured to determine an average of the number of indications of accuracy of the ranging for all UEs participating in the plurality of ranging sessions, wherein the average of the number of indications of accuracy of ranging is compared to the predetermined threshold; and the at least one processor is further configured to initiate with the plurality of responder UEs the new ranging session that uses the second ranging signal bandwidth in response to the comparison of the average of the number of indications of accuracy of the ranging to the predetermined threshold.

Clause 25. The initiator UE of clause 24, wherein the predetermined threshold is based on an accuracy requirement for the ranging sessions.

Clause 26. The initiator UE of any of clauses 17-25, wherein ranging signals in the plurality of ranging sessions are broadcast over an unlicensed spectrum using listen before transmit (LBT) procedures, wherein: the at least one processor is configured to determine to adjust the first ranging signal bandwidth to the second ranging signal bandwidth further based on at least one of a probability of successful LBT procedures determined by the initiator UE in the plurality of ranging sessions, indications received from the one or more responder UEs of a probability of successful LBT procedures performed by each respective responder UE in the plurality of ranging sessions, or a combination thereof.

Clause 27. The initiator UE of clause 26, the at least one processor is further configured to: record a number of successful LBT procedures performed by the initiator UE in a number of ranging sessions; determine an average number of successful LBT procedures based on the number of successful LBT procedures performed by the initiator UE and a number of LBT procedures performed by the initiator UE in the number of ranging sessions; and compare the average number of successful LBT procedures to a predetermined threshold; determine to decrease the first ranging signal bandwidth in the new ranging session based on the comparison of the average number of successful LBT procedures to the predetermined threshold.

Clause 28. The initiator UE of clause 27, wherein the number of ranging sessions in the plurality of ranging sessions is a predetermined number based on a speed of the initiator UE, and the predetermined threshold is based on a number of responder UEs.

Clause 29. The initiator UE of clause 26, the at least one processor is further configured to: receive from the one or more responder UEs the indications of the probability of successful LBT procedures performed by each respective responder UE in a number of ranging sessions in the plurality of ranging sessions; determine a number of UEs with the probability of successful LBT procedures based on at least the indications of the probability of successful LBT procedures performed by each respective responder UE in the number of ranging sessions in the plurality of ranging sessions; compare the number of UEs with the probability of successful LBT procedures to a predetermined threshold; and determine to decrease the first ranging signal bandwidth in the new ranging session based on the comparison of the number of UEs with the probability of successful LBT procedures to the predetermined threshold.

Clause 30. The initiator UE of clause 29, wherein the number of UEs with the probability of successful LBT procedures is further based the probability of successful LBT procedures determined by the initiator UE.

Clause 31. The initiator UE of clause 29, wherein the number of ranging session is a predetermined number based on a speed of the initiator UE, and the predetermined threshold is based on a number of responder UEs.

Clause 32. The initiator UE of any of clauses 17-31, wherein the at least one processor is further configured to adjust the first ranging signal bandwidth to the second ranging signal bandwidth in the new ranging session in response to a determination to adjust the first ranging signal bandwidth to the second ranging signal bandwidth.

Clause 33. An initiator user equipment (UE) configured for ranging between UEs in a distributed system of UEs, the initiator UE comprising: means for initiating with a plurality of responder UEs a plurality of ranging sessions that use a first ranging signal bandwidth; means for determining a range to each responder UE in each ranging session; means for determining an indication of accuracy of ranging to each responder UE in the plurality of ranging sessions; means for receiving from one or more responder UEs an indication of accuracy of ranging determined by each respective responder UE in the plurality of ranging sessions; means for determining to adjust the first ranging signal bandwidth to a second ranging signal bandwidth that is different than the first ranging signal bandwidth in a new ranging session based on the indication of accuracy of the ranging to each responder UE and the indication of accuracy of the ranging received from the one or more responder UEs.

Clause 34. The initiator UE of clause 33, wherein the indication of accuracy of the ranging received from each of the one or more responder UEs is received in a message that is separate from the ranging sessions.

Clause 35. The initiator UE of either of clauses 33 or 34, wherein the indication of accuracy of the ranging received from each of the one or more responder UEs is received in post-ranging messages in each ranging session.

Clause 36. The initiator UE of any of clauses 33-35, wherein the indication of the accuracy of the ranging to each responder UE is determined over a predetermined number of ranging sessions, wherein the predetermined number of ranging sessions is based on a speed of the initiator UE.

Clause 37. The initiator UE of clause 36, wherein the means for determining the indication of the accuracy of the ranging to each responder UE in the plurality of ranging sessions comprises: means for determining a variance in the determined ranges to each responder UE over the predetermined number of ranging sessions; and means for comparing the variance in the determined ranges to each responder UE to a predetermined threshold; wherein the indication of the accuracy of the ranging to each responder UE in the plurality of ranging sessions is based on the comparison of the variance in the determined ranges to each responder UE to the predetermined threshold.

Clause 38. The initiator UE of clause 37, wherein the predetermined threshold is based on the speed of the initiator UE.

Clause 39. The initiator UE of any of clauses 33-38, wherein the means for determining to adjust the first ranging signal bandwidth to the second ranging signal bandwidth comprises: means for determining a number of indications of accuracy of ranging based on the indication of accuracy of the ranging to each responder UE and the indication of accuracy of the ranging received from the one or more responder UEs; and means for comparing the number of indications of accuracy of the ranging to a predetermined threshold; and means for determining to increase the first ranging signal bandwidth to the second ranging signal bandwidth based on the comparison of the number of indications of accuracy ranging to the predetermined threshold.

Clause 40. The initiator UE of clause 39, wherein: the means for determining the number of indications of accuracy of the ranging comprises means for determining an average of the number of indications of accuracy of the ranging for all UEs participating in the plurality of ranging sessions, wherein the average of the number of indications of accuracy of ranging is compared to the predetermined threshold; and the initiator UE further comprises means for initiating with the plurality of responder UEs the new ranging session that uses the second ranging signal bandwidth in response to the comparison of the average of the number of indications of accuracy of the ranging to the predetermined threshold.

Clause 41. The initiator UE of clause 40, wherein the predetermined threshold is based on an accuracy requirement for the ranging sessions.

Clause 42. The initiator UE of any of clauses 33-41, wherein ranging signals in the plurality of ranging sessions are broadcast over an unlicensed spectrum using listen before transmit (LBT) procedures, wherein: the means for determining to adjust the first ranging signal bandwidth to the second ranging signal bandwidth further uses at least one of a probability of successful LBT procedures determined by the initiator UE in the plurality of ranging sessions, indications received from the one or more responder UEs of a probability of successful LBT procedures performed by each respective responder UE in the plurality of ranging sessions, or a combination thereof.

Clause 43. The initiator UE of clause 42, further comprising: means for recording a number of successful LBT procedures performed by the initiator UE in a number of ranging sessions; means for determining an average number of successful LBT procedures based on the number of successful LBT procedures performed by the initiator UE and a number of LBT procedures performed by the initiator UE in the number of ranging sessions; and means for comparing the average number of successful LBT procedures to a predetermined threshold; means for determining to decrease the first ranging signal bandwidth in the new ranging session based on the comparison of the average number of successful LBT procedures to the predetermined threshold.

Clause 44. The initiator UE of clause 43, wherein the number of ranging sessions in the plurality of ranging sessions is a predetermined number based on a speed of the initiator UE, and the predetermined threshold is based on a number of responder UEs.

Clause 45. The initiator UE of clause 42, further comprising: means for receiving from the one or more responder UEs the indications of the probability of successful LBT procedures performed by each respective responder UE in a number of ranging sessions in the plurality of ranging sessions; means for determining a number of UEs with the probability of successful LBT procedures based on at least the indications of the probability of successful LBT procedures performed by each respective responder UE in the number of ranging sessions in the plurality of ranging sessions; means for comparing the number of UEs with the probability of successful LBT procedures to a predetermined threshold; and means for determining to decrease the first ranging signal bandwidth in the new ranging session based on the comparison of the number of UEs with the probability of successful LBT procedures to the predetermined threshold.

Clause 46. The initiator UE of clause 45, wherein the number of UEs with the probability of successful LBT procedures is further based the probability of successful LBT procedures determined by the initiator UE.

Clause 47. The initiator UE of clause 45, wherein the number of ranging session is a predetermined number based on a speed of the initiator UE, and the predetermined threshold is based on a number of responder UEs.

Clause 48. The initiator UE of any of clauses 33-47, further comprising means for adjusting the first ranging signal bandwidth to the second ranging signal bandwidth in the new ranging session in response to a determination to adjust the first ranging signal bandwidth to the second ranging signal bandwidth.

Clause 49. A non-transitory storage medium including program code stored thereon, the program code is operable to configure at least one processor in an initiator user equipment (UE) for ranging between UEs in a distributed system of UEs, the program code comprising instructions to: initiate with a plurality of responder UEs a plurality of ranging sessions that use a first ranging signal bandwidth; determine a range to each responder UE in each ranging session; determine an indication of accuracy of ranging to each responder UE in the plurality of ranging sessions; receive from one or more responder UEs an indication of accuracy of ranging determined by each respective responder UE in the plurality of ranging sessions; determine to adjust the first ranging signal bandwidth to a second ranging signal bandwidth that is different than the first ranging signal bandwidth in a new ranging session based on the indication of accuracy of the ranging to each responder UE and the indication of accuracy of the ranging received from the one or more responder UEs.

Clause 50. The non-transitory storage medium of clause 49, wherein the indication of accuracy of the ranging received from each of the one or more responder UEs is received in a message that is separate from the ranging sessions.

Clause 51. The non-transitory storage medium of either of clauses 49 or 50, wherein the indication of accuracy of the ranging received from each of the one or more responder UEs is received in post-ranging messages in each ranging session.

Clause 52. The non-transitory storage medium of any of clauses 49-51, wherein the indication of the accuracy of the ranging to each responder UE is determined over a predetermined number of ranging sessions, wherein the predetermined number of ranging sessions is based on a speed of the initiator UE.

Clause 53. The non-transitory storage medium of clause 52, wherein the program code to determine the indication of the accuracy of the ranging to each responder UE in the plurality of ranging sessions comprises program code to: determine a variance in the determined ranges to each responder UE over the predetermined number of ranging sessions; and compare the variance in the determined ranges to each responder UE to a predetermined threshold; wherein the indication of the accuracy of the ranging to each responder UE in the plurality of ranging sessions is based on the comparison of the variance in the determined ranges to each responder UE to the predetermined threshold.

Clause 54. The non-transitory storage medium of clause 53, wherein the predetermined threshold is based on the speed of the initiator UE.

Clause 55. The non-transitory storage medium of any of clauses 49-54, wherein the program code to determine to adjust the first ranging signal bandwidth to the second ranging signal bandwidth comprises program code to: determine a number of indications of accuracy of ranging based on the indication of accuracy of the ranging to each responder UE and the indication of accuracy of the ranging received from the one or more responder UEs; and compare the number of indications of accuracy of the ranging to a predetermined threshold; and determine to increase the first ranging signal bandwidth to the second ranging signal bandwidth based on the comparison of the number of indications of accuracy ranging to the predetermined threshold.

Clause 56. The non-transitory storage medium of clause 55, wherein: the program code to determine the number of indications of accuracy of the ranging comprises program code to determine an average of the number of indications of accuracy of the ranging for all UEs participating in the plurality of ranging sessions, wherein the average of the number of indications of accuracy of ranging is compared to the predetermined threshold; and the non-transitory storage medium further comprises program code to initiate with the plurality of responder UEs the new ranging session that uses the second ranging signal bandwidth in response to the comparison of the average of the number of indications of accuracy of the ranging to the predetermined threshold.

Clause 57. The non-transitory storage medium of clause 56, wherein the predetermined threshold is based on an accuracy requirement for the ranging sessions.

Clause 58. The non-transitory storage medium of any of clauses 49-57, wherein ranging signals in the plurality of ranging sessions are broadcast over an unlicensed spectrum using listen before transmit (LBT) procedures, wherein: the program code to determining to adjust the first ranging signal bandwidth to the second ranging signal bandwidth further uses at least one of a probability of successful LBT procedures determined by the initiator UE in the plurality of ranging sessions, indications received from the one or more responder UEs of a probability of successful LBT procedures performed by each respective responder UE in the plurality of ranging sessions, or a combination thereof.

Clause 59. The non-transitory storage medium of clause 58, further comprising program code to: record a number of successful LBT procedures performed by the initiator UE in a number of ranging sessions; determine an average number of successful LBT procedures based on the number of successful LBT procedures performed by the initiator UE and a number of LBT procedures performed by the initiator UE in the number of ranging sessions; and compare the average number of successful LBT procedures to a predetermined threshold; determine to decrease the first ranging signal bandwidth in the new ranging session based on the comparison of the average number of successful LBT procedures to the predetermined threshold.

Clause 60. The non-transitory storage medium of clause 59, wherein the number of ranging sessions in the plurality of ranging sessions is a predetermined number based on a speed of the initiator UE, and the predetermined threshold is based on a number of responder UEs.

Clause 61. The non-transitory storage medium of clause 58, further comprising program code to: receive from the one or more responder UEs the indications of the probability of successful LBT procedures performed by each respective responder UE in a number of ranging sessions in the plurality of ranging sessions; determine a number of UEs with the probability of successful LBT procedures based on at least the indications of the probability of successful LBT procedures performed by each respective responder UE in the number of ranging sessions in the plurality of ranging sessions; compare the number of UEs with the probability of successful LBT procedures to a predetermined threshold; and determine to decrease the first ranging signal bandwidth in the new ranging session based on the comparison of the number of UEs with the probability of successful LBT procedures to the predetermined threshold.

Clause 62. The non-transitory storage medium of clause 61, wherein the number of UEs with the probability of successful LBT procedures is further based the probability of successful LBT procedures determined by the initiator UE.

Clause 63. The non-transitory storage medium of clause 61, wherein the number of ranging session is a predetermined number based on a speed of the initiator UE, and the predetermined threshold is based on a number of responder UEs.

Clause 64. The non-transitory storage medium of any of clauses 63-63, further comprising program code to adjust the first ranging signal bandwidth to the second ranging signal bandwidth in the new ranging session in response to a determination to adjust the first ranging signal bandwidth to the second ranging signal bandwidth.

Clause 65. A method of ranging performed by a responder user equipment (UE) in a distributed system of UEs, the method comprising: receiving from an initiator UE initiation of a plurality of ranging sessions that use a first ranging signal bandwidth; determining a range to the initiator UE in each ranging session; determining an indication of accuracy of ranging to the initiator UE in the plurality of ranging sessions; sending to the initiator UE the indication of accuracy of the ranging; and receiving from the initiator UE an initiation of a new ranging session that uses a second ranging signal bandwidth that is different than the first ranging signal bandwidth and that is at least partly in response to the indication of accuracy of the ranging sent to the initiator UE.

Clause 66. The method of clause 65, wherein the indication of accuracy of the ranging is sent in a message that is separate from the ranging sessions.

Clause 67. The method of either of clauses 65 or 66, wherein the indication of accuracy of the ranging is sent in post-ranging messages in each ranging session.

Clause 68. The method of any of clauses 65-67, wherein the indication of the accuracy of the ranging is determined over a predetermined number of ranging sessions, wherein the predetermined number of ranging sessions is based on a speed of the initiator UE.

Clause 69. The method of clause 68, wherein determining the indication of the accuracy of the ranging to the initiator UE in the plurality of ranging sessions comprises: determining a variance in the ranges to the initiator UE over the predetermined number of ranging sessions; and comparing the variance in the ranges to a predetermined threshold; wherein the indication of the accuracy of the ranging is based on the comparison of the variance in the ranges to the predetermined threshold.

Clause 70. The method of clause 69, wherein the predetermined threshold is based on the speed of the initiator UE.

Clause 71. The method of any of clauses 65-70, wherein ranging signals in the plurality of ranging sessions are broadcast over an unlicensed spectrum using listen before transmit (LBT) procedures, the method further comprising: determining an indication of a probability of successful LBT procedures performed in the plurality of ranging sessions; and sending the indication of the probability of successful LBT procedures to the initiator UE; wherein the initiation of the new ranging session including the second ranging signal bandwidth is further at least partly in response to the indication of the probability of successful LBT procedures.

Clause 72. The method of clause 71, wherein determining the indication of the probability of successful LBT procedures comprises: recording a number of successful LBT procedures performed in a number of ranging sessions; determining an average number of successful LBT procedures based on the number of successful LBT procedures and a number of LBT procedures performed by the responder UE in the number of ranging sessions; and comparing the average number of successful LBT procedures to a predetermined threshold; wherein the indication of the probability of successful LBT procedures is based on the comparison of the average number of successful LBT procedures to the predetermined threshold.

Clause 73. The method of clause 72, wherein the number of ranging sessions is a predetermined number based on a speed of the initiator UE, and the predetermined threshold is based on a number of responder UEs.

Clause 74. A responder user equipment (UE) configured for ranging between UEs in a distributed system of UEs, the responder UE comprising: a wireless transceiver configured to wirelessly communicate with entities in a wireless network; at least one memory; and at least one processor coupled to the wireless transceiver and the at least one memory, wherein the at least one processor is configured to: receive from an initiator UE initiation of a plurality of ranging sessions that use a first ranging signal bandwidth; determine a range to the initiator UE in each ranging session; determine an indication of accuracy of ranging to the initiator UE in the plurality of ranging sessions; send to the initiator UE the indication of accuracy of the ranging; and receive from the initiator UE an initiation of a new ranging session that uses a second ranging signal bandwidth that is different than the first ranging signal bandwidth and that is at least partly in response to the indication of accuracy of the ranging sent to the initiator UE.

Clause 75. The responder UE of clause 74, wherein the indication of accuracy of the ranging is sent in a message that is separate from the ranging sessions.

Clause 76. The responder UE of either of clauses 74 or 75, wherein the indication of accuracy of the ranging is sent in post-ranging messages in each ranging session.

Clause 77. The responder UE of any of clauses 74-76, wherein the indication of the accuracy of the ranging is determined over a predetermined number of ranging sessions, wherein the predetermined number of ranging sessions is based on a speed of the initiator UE.

Clause 78. The responder UE of clause 77, wherein the at least one processor is configured to determine the indication of the accuracy of the ranging to the initiator UE in the plurality of ranging sessions by being configured to: determine a variance in the ranges to the initiator UE over the predetermined number of ranging sessions; and compare the variance in the ranges to a predetermined threshold; wherein the indication of the accuracy of the ranging is based on the comparison of the variance in the ranges to the predetermined threshold.

Clause 79. The responder UE of clause 78, wherein the predetermined threshold is based on the speed of the initiator UE.

Clause 80. The responder UE of any of clauses 74-79, wherein ranging signals in the plurality of ranging sessions are broadcast over an unlicensed spectrum using listen before transmit (LBT) procedures, wherein the at least one processor is further configured to: determine an indication of a probability of successful LBT procedures performed in the plurality of ranging sessions; and send the indication of the probability of successful LBT procedures to the initiator UE; wherein the initiation of the new ranging session including the second ranging signal bandwidth is further at least partly in response to the indication of the probability of successful LBT procedures.

Clause 81. The responder UE of clause 80, wherein the at least one processor is configured to determine the indication of the probability of successful LBT procedures by being configured to: record a number of successful LBT procedures performed in a number of ranging sessions; determine an average number of successful LBT procedures based on the number of successful LBT procedures and a number of LBT procedures performed by the responder UE in the number of ranging sessions; and compare the average number of successful LBT procedures to a predetermined threshold; wherein the indication of the probability of successful LBT procedures is based on the comparison of the average number of successful LBT procedures to the predetermined threshold.

Clause 82. The responder UE of clause 81, wherein the number of ranging sessions is a predetermined number based on a speed of the initiator UE, and the predetermined threshold is based on a number of responder UEs.

Clause 83. A responder user equipment (UE) configured for ranging between UEs in a distributed system of UEs, the responder UE comprising: means for receiving from an initiator UE initiation of a plurality of ranging sessions that use a first ranging signal bandwidth; means for determining a range to the initiator UE in each ranging session; means for determining an indication of accuracy of ranging to the initiator UE in the plurality of ranging sessions; means for sending to the initiator UE the indication of accuracy of the ranging; and means for receiving from the initiator UE an initiation of a new ranging session that uses a second ranging signal bandwidth that is different than the first ranging signal bandwidth and that is at least partly in response to the indication of accuracy of the ranging sent to the initiator UE.

Clause 84. The responder UE of clause 83, wherein the indication of accuracy of the ranging is sent in a message that is separate from the ranging sessions.

Clause 85. The responder UE of either of clauses 83 or 84, wherein the indication of accuracy of the ranging is sent in post-ranging messages in each ranging session.

Clause 86. The responder UE of any of clauses 83-85, wherein the indication of the accuracy of the ranging is determined over a predetermined number of ranging sessions, wherein the predetermined number of ranging sessions is based on a speed of the initiator UE.

Clause 87. The responder UE of clause 86, wherein the means for determining the indication of the accuracy of the ranging to the initiator UE in the plurality of ranging sessions comprises: means for determining a variance in the ranges to the initiator UE over the predetermined number of ranging sessions; and means for comparing the variance in the ranges to a predetermined threshold; wherein the indication of the accuracy of the ranging is based on the comparison of the variance in the ranges to the predetermined threshold.

Clause 88. The responder UE of clause 87, wherein the predetermined threshold is based on the speed of the initiator UE.

Clause 89. The responder UE of any of clauses 83-88, wherein ranging signals in the plurality of ranging sessions are broadcast over an unlicensed spectrum using listen before transmit (LBT) procedures, further comprising: means for determining an indication of a probability of successful LBT procedures performed in the plurality of ranging sessions; and means for sending the indication of the probability of successful LBT procedures to the initiator UE; wherein the initiation of the new ranging session including the second ranging signal bandwidth is further at least partly in response to the indication of the probability of successful LBT procedures.

Clause 90. The responder UE of clause 89, wherein the means for determining the indication of the probability of successful LBT procedures comprises: means for recording a number of successful LBT procedures performed in a number of ranging sessions; means for determining an average number of successful LBT procedures based on the number of successful LBT procedures and a number of LBT procedures performed by the responder UE in the number of ranging sessions; and means for comparing the average number of successful LBT procedures to a predetermined threshold; wherein the indication of the probability of successful LBT procedures is based on the comparison of the average number of successful LBT procedures to the predetermined threshold.

Clause 91. The responder UE of clause 91, wherein the number of ranging sessions is a predetermined number based on a speed of the initiator UE, and the predetermined threshold is based on a number of responder UEs.

Clause 92. A non-transitory storage medium including program code stored thereon, the program code is operable to configure at least one processor in a responder user equipment (UE) for ranging between UEs in a distributed system of UEs, the program code comprising instructions to: receive from an initiator UE initiation of a plurality of ranging sessions that use a first ranging signal bandwidth; determine a range to the initiator UE in each ranging session; determine an indication of accuracy of ranging to the initiator UE in the plurality of ranging sessions; send to the initiator UE the indication of accuracy of the ranging; and receive from the initiator UE an initiation of a new ranging session that uses a second ranging signal bandwidth that is different than the first ranging signal bandwidth and that is at least partly in response to the indication of accuracy of the ranging sent to the initiator UE.

Clause 93. The non-transitory storage medium of clause 92, wherein the indication of accuracy of the ranging is sent in a message that is separate from the ranging sessions.

Clause 94. The non-transitory storage medium of either of clauses 92 or 93, wherein the indication of accuracy of the ranging is sent in post-ranging messages in each ranging session.

Clause 95. The non-transitory storage medium of any of clauses 92-94, wherein the indication of the accuracy of the ranging is determined over a predetermined number of ranging sessions, wherein the predetermined number of ranging sessions is based on a speed of the initiator UE.

Clause 96. The non-transitory storage medium of clause 85, wherein the program code to determine the indication of the accuracy of the ranging to the initiator UE in the plurality of ranging sessions comprises program code to: determine a variance in the ranges to the initiator UE over the predetermined number of ranging sessions; and compare the variance in the ranges to a predetermined threshold; wherein the indication of the accuracy of the ranging is based on the comparison of the variance in the ranges to the predetermined threshold.

Clause 97. The non-transitory storage medium of clause 96, wherein the predetermined threshold is based on the speed of the initiator UE.

Clause 98. The non-transitory storage medium of any of clauses 92-97, wherein ranging signals in the plurality of ranging sessions are broadcast over an unlicensed spectrum using listen before transmit (LBT) procedures, further comprising program code to: determine an indication of a probability of successful LBT procedures performed in the plurality of ranging sessions; and send the indication of the probability of successful LBT procedures to the initiator UE; wherein the initiation of the new ranging session including the second ranging signal bandwidth is further at least partly in response to the indication of the probability of successful LBT procedures.

Clause 99. The non-transitory storage medium of clause 98, wherein the program code to determining the indication of the probability of successful LBT procedures comprises program code to: record a number of successful LBT procedures performed in a number of ranging sessions; determine an average number of successful LBT procedures based on the number of successful LBT procedures and a number of LBT procedures performed by the responder UE in the number of ranging sessions; and compare the average number of successful LBT procedures to a predetermined threshold; wherein the indication of the probability of successful LBT procedures is based on the comparison of the average number of successful LBT procedures to the predetermined threshold.

Clause 100. The non-transitory storage medium of clause 99, wherein the number of ranging sessions is a predetermined number based on a speed of the initiator UE, and the predetermined threshold is based on a number of responder UEs.

Therefore, it is intended that claimed subject matter not be limited to the particular examples disclosed, but that such claimed subject matter may also include all aspects falling within the scope of appended claims, and equivalents thereof.

What is claimed is:

1. A method of ranging performed by an initiator user equipment (UE) in a distributed system of UEs, the method comprising:
   initiating with a plurality of responder UEs a plurality of ranging sessions that use a first ranging signal bandwidth;
   determining a range to each responder UE in each ranging session;
   determining an indication of accuracy of ranging to each responder UE in the plurality of ranging sessions;
   receiving from one or more responder UEs an indication of accuracy of ranging determined by each respective responder UE in the plurality of ranging sessions;
   determining to adjust the first ranging signal bandwidth to a second ranging signal bandwidth that is different than the first ranging signal bandwidth in a new ranging session based on the indication of accuracy of the ranging to each responder UE and the indication of accuracy of the ranging received from the one or more responder UEs.

2. The method of claim 1, wherein the indication of accuracy of the ranging received from each of the one or more responder UEs is received in a message that is separate from the ranging sessions.

3. The method of claim 1, wherein the indication of accuracy of the ranging received from each of the one or more responder UEs is received in post-ranging messages in each ranging session.

4. The method of claim 1, wherein the indication of the accuracy of the ranging to each responder UE is determined over a predetermined number of ranging sessions, wherein the predetermined number of ranging sessions is based on a speed of the initiator UE.

5. The method of claim 4, wherein determining the indication of the accuracy of the ranging to each responder UE in the plurality of ranging sessions comprises:
   determining a variance in the determined ranges to each responder UE over the predetermined number of ranging sessions; and
   comparing the variance in the determined ranges to each responder UE to a predetermined threshold;
   wherein the indication of the accuracy of the ranging to each responder UE in the plurality of ranging sessions is based on the comparison of the variance in the determined ranges to each responder UE to the predetermined threshold.

6. The method of claim 5, wherein the predetermined threshold is based on the speed of the initiator UE.

7. The method of claim 1, wherein determining to adjust the first ranging signal bandwidth to the second ranging signal bandwidth comprises:
   determining a number of indications of accuracy of ranging based on the indication of accuracy of the ranging to each responder UE and the indication of accuracy of the ranging received from the one or more responder UEs; and
   comparing the number of indications of accuracy of the ranging to a predetermined threshold; and
   determining to increase the first ranging signal bandwidth to the second ranging signal bandwidth based on the comparison of the number of indications of accuracy ranging to the predetermined threshold.

8. The method of claim 7, wherein:
   determining the number of indications of accuracy of the ranging comprises determining an average of the number of indications of accuracy of the ranging for all UEs participating in the plurality of ranging sessions, wherein the average of the number of indications of accuracy of ranging is compared to the predetermined threshold; and
   the method further comprises initiating with the plurality of responder UEs the new ranging session that uses the second ranging signal bandwidth in response to the comparison of the average of the number of indications of accuracy of the ranging to the predetermined threshold.

9. The method of claim 8, wherein the predetermined threshold is based on an accuracy requirement for the ranging sessions.

10. The method of claim 1, wherein ranging signals in the plurality of ranging sessions are broadcast over an unlicensed spectrum using listen before transmit (LBT) procedures, wherein:
    determining to adjust the first ranging signal bandwidth to the second ranging signal bandwidth is further based on at least one of a probability of successful LBT procedures determined by the initiator UE in the plurality of ranging sessions, indications received from the one or more responder UEs of a probability of successful LBT procedures performed by each respective responder UE in the plurality of ranging sessions, or a combination thereof.

11. The method of claim 10, further comprising:
    recording a number of successful LBT procedures performed by the initiator UE in a number of ranging sessions;
    determining an average number of successful LBT procedures based on the number of successful LBT procedures performed by the initiator UE and a number of LBT procedures performed by the initiator UE in the number of ranging sessions; and
    comparing the average number of successful LBT procedures to a predetermined threshold;
    determining to decrease the first ranging signal bandwidth in the new ranging session based on the comparison of the average number of successful LBT procedures to the predetermined threshold.

12. The method of claim 11, wherein the number of ranging sessions in the plurality of ranging sessions is a predetermined number based on a speed of the initiator UE, and the predetermined threshold is based on a number of responder UEs.

13. The method of claim 10, further comprising:
receiving from the one or more responder UEs the indications of the probability of successful LBT procedures performed by each respective responder UE in a number of ranging sessions in the plurality of ranging sessions;
determining a number of UEs with the probability of successful LBT procedures based on at least the indications of the probability of successful LBT procedures performed by each respective responder UE in the number of ranging sessions in the plurality of ranging sessions;
comparing the number of UEs with the probability of successful LBT procedures to a predetermined threshold; and
determining to decrease the first ranging signal bandwidth in the new ranging session based on the comparison of the number of UEs with the probability of successful LBT procedures to the predetermined threshold.

14. The method of claim 13, wherein the number of UEs with the probability of successful LBT procedures is further based the probability of successful LBT procedures determined by the initiator UE.

15. The method of claim 13, wherein the number of ranging session is a predetermined number based on a speed of the initiator UE, and the predetermined threshold is based on a number of responder UEs.

16. The method of claim 1, further comprising adjusting the first ranging signal bandwidth to the second ranging signal bandwidth in the new ranging session in response to a determination to adjust the first ranging signal bandwidth to the second ranging signal bandwidth.

17. An initiator user equipment (UE) configured for ranging between UEs in a distributed system of UEs, the initiator UE comprising:
a wireless transceiver configured to wirelessly communicate with entities in a wireless network;
at least one memory; and
at least one processor coupled to the wireless transceiver and the at least one memory, wherein the at least one processor is configured to:
initiate with a plurality of responder UEs a plurality of ranging sessions that use a first ranging signal bandwidth;
determine a range to each responder UE in each ranging session;
determine an indication of accuracy of ranging to each responder UE in the plurality of ranging sessions;
receive from one or more responder UEs an indication of accuracy of ranging determined by each respective responder UE in the plurality of ranging sessions;
determine to adjust the first ranging signal bandwidth to a second ranging signal bandwidth that is different than the first ranging signal bandwidth in a new ranging session based on the indication of accuracy of the ranging to each responder UE and the indication of accuracy of the ranging received from the one or more responder UEs.

18. The initiator UE of claim 17, wherein the indication of accuracy of the ranging received from each of the one or more responder UEs is received in a message that is separate from the ranging sessions.

19. The initiator UE of claim 17, wherein the indication of accuracy of the ranging received from each of the one or more responder UEs is received in post-ranging messages in each ranging session.

20. The initiator UE of claim 17, wherein the indication of the accuracy of the ranging to each responder UE is determined over a predetermined number of ranging sessions, wherein the predetermined number of ranging sessions is based on a speed of the initiator UE.

21. The initiator UE of claim 20, wherein the at least one processor is configured to determine the indication of the accuracy of the ranging to each responder UE in the plurality of ranging sessions by being configured to:
determine a variance in the determined ranges to each responder UE over the predetermined number of ranging sessions; and
compare the variance in the determined ranges to each responder UE to a predetermined threshold;
wherein the indication of the accuracy of the ranging to each responder UE in the plurality of ranging sessions is based on the comparison of the variance in the determined ranges to each responder UE to the predetermined threshold.

22. The initiator UE of claim 21, wherein the predetermined threshold is based on the speed of the initiator UE.

23. The initiator UE of claim 17, wherein the at least one processor is configured to determine to adjust the first ranging signal bandwidth to the second ranging signal bandwidth by being configured to:
determine a number of indications of accuracy of ranging based on the indication of accuracy of the ranging to each responder UE and the indication of accuracy of the ranging received from the one or more responder UEs; and
compare the number of indications of accuracy of the ranging to a predetermined threshold; and
determine to increase the first ranging signal bandwidth to the second ranging signal bandwidth based on the comparison of the number of indications of accuracy ranging to the predetermined threshold.

24. The initiator UE of claim 23, wherein:
the at least one processor is configured to determine the number of indications of accuracy of the ranging by being configured to determine an average of the number of indications of accuracy of the ranging for all UEs participating in the plurality of ranging sessions, wherein the average of the number of indications of accuracy of ranging is compared to the predetermined threshold; and
the at least one processor is further configured to initiate with the plurality of responder UEs the new ranging session that uses the second ranging signal bandwidth in response to the comparison of the average of the number of indications of accuracy of the ranging to the predetermined threshold.

25. The initiator UE of claim 24, wherein the predetermined threshold is based on an accuracy requirement for the ranging sessions.

26. The initiator UE of claim 17, wherein ranging signals in the plurality of ranging sessions are broadcast over an unlicensed spectrum using listen before transmit (LBT) procedures, wherein:
the at least one processor is configured to determine to adjust the first ranging signal bandwidth to the second ranging signal bandwidth further based on at least one of a probability of successful LBT procedures determined by the initiator UE in the plurality of ranging sessions, indications received from the one or more responder UEs of a probability of successful LBT procedures performed by each respective responder UE in the plurality of ranging sessions, or a combination thereof.

27. The initiator UE of claim 26, the at least one processor is further configured to:
   record a number of successful LBT procedures performed by the initiator UE in a number of ranging sessions;
   determine an average number of successful LBT procedures based on the number of successful LBT procedures performed by the initiator UE and a number of LBT procedures performed by the initiator UE in the number of ranging sessions; and
   compare the average number of successful LBT procedures to a predetermined threshold;
   determine to decrease the first ranging signal bandwidth in the new ranging session based on the comparison of the average number of successful LBT procedures to the predetermined threshold.

28. The initiator UE of claim 27, wherein the number of ranging sessions in the plurality of ranging sessions is a predetermined number based on a speed of the initiator UE, and the predetermined threshold is based on a number of responder UEs.

29. The initiator UE of claim 26, the at least one processor is further configured to:
   receive from the one or more responder UEs the indications of the probability of successful LBT procedures performed by each respective responder UE in a number of ranging sessions in the plurality of ranging sessions;
   determine a number of UEs with the probability of successful LBT procedures based on at least the indications of the probability of successful LBT procedures performed by each respective responder UE in the number of ranging sessions in the plurality of ranging sessions;
   compare the number of UEs with the probability of successful LBT procedures to a predetermined threshold; and
   determine to decrease the first ranging signal bandwidth in the new ranging session based on the comparison of the number of UEs with the probability of successful LBT procedures to the predetermined threshold.

30. The initiator UE of claim 29, wherein the number of UEs with the probability of successful LBT procedures is further based the probability of successful LBT procedures determined by the initiator UE.

31. The initiator UE of claim 29, wherein the number of ranging session is a predetermined number based on a speed of the initiator UE, and the predetermined threshold is based on a number of responder UEs.

32. The initiator UE of claim 17, wherein the at least one processor is further configured to adjust the first ranging signal bandwidth to the second ranging signal bandwidth in the new ranging session in response to a determination to adjust the first ranging signal bandwidth to the second ranging signal bandwidth.

33. A method of ranging performed by a responder user equipment (UE) in a distributed system of UEs, the method comprising:
   receiving from an initiator UE initiation of a plurality of ranging sessions that use a first ranging signal bandwidth;
   determining a range to the initiator UE in each ranging session;
   determining an indication of accuracy of ranging to the initiator UE in the plurality of ranging sessions;
   sending to the initiator UE the indication of accuracy of the ranging; and
   receiving from the initiator UE an initiation of a new ranging session that uses a second ranging signal bandwidth that is different than the first ranging signal bandwidth and that is at least partly in response to the indication of accuracy of the ranging sent to the initiator UE.

34. The method of claim 33, wherein the indication of accuracy of the ranging is sent in a message that is separate from the ranging sessions.

35. The method of claim 33, wherein the indication of accuracy of the ranging is sent in post-ranging messages in each ranging session.

36. The method of claim 33, wherein the indication of the accuracy of the ranging is determined over a predetermined number of ranging sessions, wherein the predetermined number of ranging sessions is based on a speed of the initiator UE.

37. The method of claim 36, wherein determining the indication of the accuracy of the ranging to the initiator UE in the plurality of ranging sessions comprises:
   determining a variance in the ranges to the initiator UE over the predetermined number of ranging sessions; and
   comparing the variance in the ranges to a predetermined threshold;
   wherein the indication of the accuracy of the ranging is based on the comparison of the variance in the ranges to the predetermined threshold.

38. The method of claim 37, wherein the predetermined threshold is based on the speed of the initiator UE.

39. The method of claim 33, wherein ranging signals in the plurality of ranging sessions are broadcast over an unlicensed spectrum using listen before transmit (LBT) procedures, the method further comprising:
   determining an indication of a probability of successful LBT procedures performed in the plurality of ranging sessions; and
   sending the indication of the probability of successful LBT procedures to the initiator UE;
   wherein the initiation of the new ranging session including the second ranging signal bandwidth is further at least partly in response to the indication of the probability of successful LBT procedures.

40. The method of claim 39, wherein determining the indication of the probability of successful LBT procedures comprises:
   recording a number of successful LBT procedures performed in a number of ranging sessions;
   determining an average number of successful LBT procedures based on the number of successful LBT procedures and a number of LBT procedures performed by the responder UE in the number of ranging sessions; and
   comparing the average number of successful LBT procedures to a predetermined threshold;
   wherein the indication of the probability of successful LBT procedures is based on the comparison of the average number of successful LBT procedures to the predetermined threshold.

41. The method of claim 40, wherein the number of ranging sessions is a predetermined number based on a speed of the initiator UE, and the predetermined threshold is based on a number of responder UEs.

42. A responder user equipment (UE) configured for ranging between UEs in a distributed system of UEs, the responder UE comprising:
- a wireless transceiver configured to wirelessly communicate with entities in a wireless network;
- at least one memory; and
- at least one processor coupled to the wireless transceiver and the at least one memory, wherein the at least one processor is configured to:
  - receive from an initiator UE initiation of a plurality of ranging sessions that use a first ranging signal bandwidth;
  - determine a range to the initiator UE in each ranging session;
  - determine an indication of accuracy of ranging to the initiator UE in the plurality of ranging sessions;
  - send to the initiator UE the indication of accuracy of the ranging; and
  - receive from the initiator UE an initiation of a new ranging session that uses a second ranging signal bandwidth that is different than the first ranging signal bandwidth and that is at least partly in response to the indication of accuracy of the ranging sent to the initiator UE.

43. The responder UE of claim 42, wherein the indication of accuracy of the ranging is sent in a message that is separate from the ranging sessions.

44. The responder UE of claim 42, wherein the indication of accuracy of the ranging is sent in post-ranging messages in each ranging session.

45. The responder UE of claim 42, wherein the indication of the accuracy of the ranging is determined over a predetermined number of ranging sessions, wherein the predetermined number of ranging sessions is based on a speed of the initiator UE.

46. The responder UE of claim 45, wherein the at least one processor is configured to determine the indication of the accuracy of the ranging to the initiator UE in the plurality of ranging sessions by being configured to:
- determine a variance in the ranges to the initiator UE over the predetermined number of ranging sessions; and
- compare the variance in the ranges to a predetermined threshold;
- wherein the indication of the accuracy of the ranging is based on the comparison of the variance in the ranges to the predetermined threshold.

47. The responder UE of claim 46, wherein the predetermined threshold is based on the speed of the initiator UE.

48. The responder UE of claim 42, wherein ranging signals in the plurality of ranging sessions are broadcast over an unlicensed spectrum using listen before transmit (LBT) procedures, wherein the at least one processor is further configured to:
- determine an indication of a probability of successful LBT procedures performed in the plurality of ranging sessions; and
- send the indication of the probability of successful LBT procedures to the initiator UE;
- wherein the initiation of the new ranging session including the second ranging signal bandwidth is further at least partly in response to the indication of the probability of successful LBT procedures.

49. The responder UE of claim 48, wherein the at least one processor is configured to determine the indication of the probability of successful LBT procedures by being configured to:
- record a number of successful LBT procedures performed in a number of ranging sessions;
- determine an average number of successful LBT procedures based on the number of successful LBT procedures and a number of LBT procedures performed by the responder UE in the number of ranging sessions; and
- compare the average number of successful LBT procedures to a predetermined threshold;
- wherein the indication of the probability of successful LBT procedures is based on the comparison of the average number of successful LBT procedures to the predetermined threshold.

50. The responder UE of claim 49, wherein the number of ranging sessions is a predetermined number based on a speed of the initiator UE, and the predetermined threshold is based on a number of responder UEs.

* * * * *